United States Patent
Sinha et al.

(10) Patent No.: US 11,301,422 B2
(45) Date of Patent: Apr. 12, 2022

(54) SYSTEM AND METHODS FOR PROVIDING FAST CACHEABLE ACCESS TO A KEY-VALUE DEVICE THROUGH A FILESYSTEM INTERFACE

(71) Applicants: Vikas Sinha, Sunnyvale, CA (US); Zvi Guz, Palo Alto, CA (US); Ming Lin, San Jose, CA (US)

(72) Inventors: Vikas Sinha, Sunnyvale, CA (US); Zvi Guz, Palo Alto, CA (US); Ming Lin, San Jose, CA (US)

(73) Assignee: SAMSUNG ELECTRONICS CO., LTD.

( * ) Notice: Subject to any disclaimer, the term of this patent is extended or adjusted under 35 U.S.C. 154(b) by 1275 days.

(21) Appl. No.: 15/143,504

(22) Filed: Apr. 29, 2016

(65) Prior Publication Data
US 2017/0242867 A1   Aug. 24, 2017

Related U.S. Application Data

(60) Provisional application No. 62/298,987, filed on Feb. 23, 2016.

(51) Int. Cl.
*G06F 16/172* (2019.01)
*G06F 16/84* (2019.01)
(Continued)

(52) U.S. Cl.
CPC ........ *G06F 16/172* (2019.01); *G06F 12/0882* (2013.01); *G06F 16/13* (2019.01);
(Continued)

(58) Field of Classification Search
CPC ......... G06F 17/30132; G06F 17/30091; G06F 16/172; G06F 16/13; G06F 16/84;
(Continued)

(56) References Cited

U.S. PATENT DOCUMENTS 5,388,257 A * 2/1995 Bauer .................. G06F 16/1794
707/741
6,128,627 A * 10/2000 Mattis .................. G06F 16/221
(Continued)

FOREIGN PATENT DOCUMENTS

CN       101266548 A       9/2008
CN       102929793 A       2/2013
(Continued)

OTHER PUBLICATIONS

Jannen, William et al., "BetrFS: A Right-Optimized Write-Optimized File System", 13th USENIX Conference on File and Storage Technologies (FAST '15), Feb. 19, 2015, 16 pages.
(Continued)

*Primary Examiner* — Ashish Thomas
*Assistant Examiner* — Nargis Sultana
(74) *Attorney, Agent, or Firm* — Renaissance IP Law Group LLP

(57) ABSTRACT

A system and method for leveraging a native operating system (130) page cache (315) when using non-block system storage devices (120) is disclosed. A computer (105) may include a processor (110), memory (115), and a non-block system storage device (120). A file system (135) may be stored in memory (115) and running on the processor (110), which may include a page cache (315). A key-value file system (KVFS) (145) may reside between the file system (135) and the storage device (120) and may map received file system commands (310) to key-value system commands (330) that may be executed by the storage device (120). Results of the key-value system commands (330) may be returned to the file system (135), permitting the operating system (130) to cache data in the page cache (315).

17 Claims, 20 Drawing Sheets

(51) Int. Cl.
  *G06F 16/13* (2019.01)
  *G06F 16/188* (2019.01)
  *G06F 16/16* (2019.01)
  *G06F 12/0882* (2016.01)

(52) U.S. Cl.
  CPC .......... *G06F 16/162* (2019.01); *G06F 16/188* (2019.01); *G06F 16/84* (2019.01); *G06F 2212/603* (2013.01)

(58) Field of Classification Search
  CPC .. G06F 12/0882; G06F 16/162; G06F 16/188; G06F 2212/603
  USPC ........................................ 707/824
  See application file for complete search history.

(56) References Cited

U.S. PATENT DOCUMENTS

| | | | | |
|---|---|---|---|---|
| 6,289,358 | B1* | 9/2001 | Mattis | H04L 67/2842 707/695 |
| 6,292,880 | B1* | 9/2001 | Mattis | G06F 16/9574 711/216 |
| 6,374,297 | B1* | 4/2002 | Wolf | G06F 9/505 707/999.01 |
| 6,915,307 | B1* | 7/2005 | Mattis | G06F 16/10 |
| 7,136,867 | B1* | 11/2006 | Chatterjee | G06F 16/9027 713/171 |
| 7,237,061 | B1* | 6/2007 | Boic | G06F 12/084 711/113 |
| 7,873,619 | B1* | 1/2011 | Faibish | G06F 16/13 707/705 |
| 8,219,562 | B1* | 7/2012 | Rothschild | G06F 16/51 707/741 |
| 8,352,497 | B1* | 1/2013 | Chatterjee | G06F 16/137 707/785 |
| 8,407,403 | B2* | 3/2013 | Prabhakaran | G06F 12/0888 711/103 |
| 8,606,751 | B1* | 12/2013 | Starling | G06F 11/1458 707/634 |
| 8,880,787 | B1* | 11/2014 | Kimmel | G06F 12/0246 711/103 |
| 9,135,287 | B2* | 9/2015 | Castellano | G06F 16/13 |
| 9,201,825 | B1* | 12/2015 | Zhou | G06F 13/385 |
| 9,298,521 | B1* | 3/2016 | Feldman | G06F 3/0653 |
| 9,396,350 | B1* | 7/2016 | Feldman | G06F 3/0608 |
| 9,600,555 | B1* | 3/2017 | Feldman | G06F 3/067 |
| 9,846,642 | B2* | 12/2017 | Choi | G06F 12/0866 |
| 9,846,714 | B2 | 12/2017 | Takahashi et al. | |
| 9,870,168 | B1* | 1/2018 | Bent | G06F 3/0685 |
| 9,880,933 | B1* | 1/2018 | Gupta | G06F 12/0815 |
| 9,898,501 | B2* | 2/2018 | Bogrett | G06F 16/93 |
| 9,971,526 | B1* | 5/2018 | Wei | G06F 3/0619 |
| 10,073,969 | B1* | 9/2018 | Faibish | G06F 16/196 |
| 10,083,118 | B2* | 9/2018 | Jeong | G06F 12/0893 |
| 10,346,360 | B1* | 7/2019 | Basov | G06F 16/172 |
| 2001/0013087 | A1* | 8/2001 | Ronstrom | G06F 12/122 711/133 |
| 2002/0091702 | A1* | 7/2002 | Mullins | G06F 16/25 |
| 2002/0133491 | A1* | 9/2002 | Sim | H04L 67/1023 |
| 2003/0174170 | A1* | 9/2003 | Jung | H04N 5/85 715/767 |
| 2004/0064650 | A1* | 4/2004 | Johnson | G06F 16/9574 711/141 |
| 2004/0236761 | A1* | 11/2004 | Both | G06F 16/137 |
| 2006/0224852 | A1* | 10/2006 | Kottomtharayil | G06F 3/0686 711/170 |
| 2007/0266441 | A1* | 11/2007 | Kim | H04L 63/0823 726/26 |
| 2008/0256253 | A1* | 10/2008 | Branson | G06F 9/5072 709/231 |
| 2009/0094491 | A1* | 4/2009 | Sharma | H04L 41/0866 714/57 |
| 2009/0164709 | A1* | 6/2009 | Lee | G06F 12/023 711/103 |
| 2009/0216726 | A1* | 8/2009 | Muthaiah | G06Q 30/06 |
| 2009/0276577 | A1* | 11/2009 | Bell | G06F 16/254 711/137 |
| 2009/0303070 | A1* | 12/2009 | Zhang | G08B 27/00 340/690 |
| 2010/0049754 | A1* | 2/2010 | Takaoka | G06F 12/0866 707/E17.01 |
| 2010/0191634 | A1* | 7/2010 | Macy | G06N 3/08 705/35 |
| 2011/0004638 | A1* | 1/2011 | Nishiyama | G06F 16/20 707/812 |
| 2011/0054944 | A1* | 3/2011 | Sandberg | G16H 10/20 705/3 |
| 2011/0099154 | A1* | 4/2011 | Maydew | G06F 16/1748 707/692 |
| 2011/0099200 | A1* | 4/2011 | Blount | G06F 16/152 707/770 |
| 2011/0182424 | A1* | 7/2011 | Grube | G06F 21/72 380/43 |
| 2011/0208822 | A1* | 8/2011 | Rathod | G06F 16/9535 709/206 |
| 2013/0024599 | A1* | 1/2013 | Huang | G06F 3/0611 711/102 |
| 2013/0042060 | A1* | 2/2013 | Marukame | G06F 16/137 711/108 |
| 2013/0103729 | A1* | 4/2013 | Cooney | G06F 16/24568 707/831 |
| 2013/0219458 | A1* | 8/2013 | Ramanathan | G06F 21/10 726/1 |
| 2013/0226955 | A1* | 8/2013 | Fang | H04L 67/2842 707/769 |
| 2013/0250686 | A1* | 9/2013 | Marukame | G06F 3/0644 365/185.12 |
| 2013/0275391 | A1* | 10/2013 | Batwara | G06F 16/125 707/689 |
| 2013/0275656 | A1* | 10/2013 | Talagala | G06F 12/0246 711/103 |
| 2013/0290263 | A1* | 10/2013 | Beaverson | G06F 16/1744 707/649 |
| 2013/0332486 | A1* | 12/2013 | O'Carroll | G06F 16/2365 |
| 2014/0040286 | A1* | 2/2014 | Bane | G06F 16/164 707/754 |
| 2014/0059568 | A1* | 2/2014 | Wang | G06F 9/541 719/318 |
| 2014/0067853 | A1* | 3/2014 | Yamazaki | G06F 16/245 707/769 |
| 2014/0095775 | A1* | 4/2014 | Talagala | G06F 12/0246 711/103 |
| 2014/0195725 | A1* | 7/2014 | Bennett | G06F 12/06 711/103 |
| 2014/0310499 | A1* | 10/2014 | Sundararaman | G06F 16/2308 711/203 |
| 2014/0337459 | A1* | 11/2014 | Kuang | H04L 67/2842 709/213 |
| 2014/0365541 | A1* | 12/2014 | Darcy | G06F 16/182 707/827 |
| 2015/0074071 | A1* | 3/2015 | Bogrett | G06F 16/93 707/703 |
| 2015/0074084 | A1* | 3/2015 | Bogrett | G06F 16/2455 707/716 |
| 2015/0074341 | A1* | 3/2015 | Marukame | G06F 12/0246 711/103 |
| 2015/0095575 | A1* | 4/2015 | Oh | G06F 12/0802 711/118 |
| 2015/0113223 | A1* | 4/2015 | Brown | G06F 12/0238 711/133 |
| 2015/0113326 | A1* | 4/2015 | Talagala | G06F 11/1443 714/24 |
| 2015/0278397 | A1* | 10/2015 | Hendrickson | G06F 16/9024 707/798 |
| 2015/0286657 | A1* | 10/2015 | Vaghani | G06F 16/9017 707/829 |
| 2015/0302111 | A1* | 10/2015 | Yue | G06F 16/188 707/827 |
| 2016/0034507 | A1* | 2/2016 | Aron | G06F 16/219 707/722 |

(56) References Cited

U.S. PATENT DOCUMENTS

| | | | | |
|---|---|---|---|---|
| 2016/0041918 | A1* | 2/2016 | Jeong | G11C 15/046 711/103 |
| 2016/0063008 | A1* | 3/2016 | Benight | G06F 16/164 707/694 |
| 2016/0078052 | A1* | 3/2016 | Srivas | G06F 16/1844 707/611 |
| 2016/0099810 | A1* | 4/2016 | Li | G11C 15/00 713/193 |
| 2016/0188256 | A1* | 6/2016 | Park | G06F 3/067 710/74 |
| 2017/0004083 | A1* | 1/2017 | Jain | G06F 12/0868 |
| 2017/0091215 | A1* | 3/2017 | Beard | G06F 16/184 |
| 2017/0091262 | A1* | 3/2017 | Beard | G06F 16/172 |
| 2017/0109041 | A1* | 4/2017 | Qiu | G06F 3/0679 |
| 2017/0139610 | A1* | 5/2017 | Choi | G06F 12/0873 |
| 2017/0192892 | A1* | 7/2017 | Pundir | G06F 12/0873 |
| 2017/0249331 | A1* | 8/2017 | Yammine | G06F 11/1448 |
| 2017/0371912 | A1* | 12/2017 | Kimura | G06F 11/1451 |
| 2018/0039650 | A9* | 2/2018 | Kanteti | G06F 3/067 |
| 2018/0210970 | A1 | 7/2018 | Marukame et al. | |

FOREIGN PATENT DOCUMENTS

| | | | | |
|---|---|---|---|---|
| CN | 103150394 | A | 6/2013 | |
| CN | 104394209 | A | 3/2015 | |
| CN | 105022739 | A | 11/2015 | |
| JP | 2014048741 | A | 3/2014 | |
| JP | 2015153014 | A | 8/2015 | |
| KR | 2009-0065136 | A * | 12/2007 | G06F 12/00 |
| KR | 20090065136 | A * | 6/2009 | G06F 12/00 |

OTHER PUBLICATIONS

Shetty, Pradeep J., "From Tuples to Files: a Fast Transactional System Store and File System", Stony Brook University Technical Report FSL-12-03, May 2, 2012, 52 pages.

Volos, Haris et al., "Storage-Class Memory Needs Flexible Interfaces", APSYS '13 Proceedings of the 4th Asia-Pacific Workshop on Systems, Jul. 30, 2013, 7 pages.

Wu, Chin-Hsien, et al., "An Efficient B-Tree Layer for Flash-Memory Storage Systems," ACM Transactions on Embedded Computing Systems 6(3), Jul. 2007, 20 pages.

* cited by examiner

| File Descriptor Locator Table | |
|---|---|
| Hash 1 705 | File Descriptor 1 710 |
| Hash 2 715 | File Descriptor 2 720 |
| Hash 3 725 | File Descriptor 3 730 |
| ⋮ | ⋮ |

SYSTEM AND METHODS FOR PROVIDING FAST CACHEABLE ACCESS TO A KEY-VALUE DEVICE THROUGH A FILESYSTEM INTERFACE

RELATED APPLICATION DATA

This application claims the benefit of U.S. Provisional Patent Application Ser. No. 62/298,987, filed Feb. 23, 2016, which is incorporated by reference herein for all purposes.

FIELD

This inventive concept relates to key-value stores, and more particularly to using an operating systems cache when accessing a key-value device.

BACKGROUND

Existing operating systems implement a myriad of mechanisms to cache file system data in memory and improve performance. Specifically, the page cache (or buffer cache) heavily caches frequently accessed data to improve overall file system performance. While the page cache itself does not require a file system to reside on a block device, in practice, most configurations that utilize a page cache to improve file system performance require the file system to be resident on a block device.

Key-value Solid State Drives (SSDs) are an emerging technology that delivers better storage performance. But the key-value system used by these SSDs exports object semantics rather than block semantics, and thus may not usually be connected to the page cache. Using key-value SSDs currently requires either bypassing the file system entirely or using a file system without the benefits of the page cache. In either case, data from the key-value SSD is not cached in the operating system's page cache or buffer cache.

This creates a performance cliff, and usually requires the user program to implement its own caching mechanism to restore reasonable performance. Implementing a cache within the user program is a significant complexity and software development cost for the user. Moreover, when user space caching is used, different programs may not easily share their caches, and the entire cache content is lost when the program terminates.

A need remains for a way to permit a system with a key-value SSD to utilize the benefits of the page cache.

DETAILED DESCRIPTION

Figure 1:
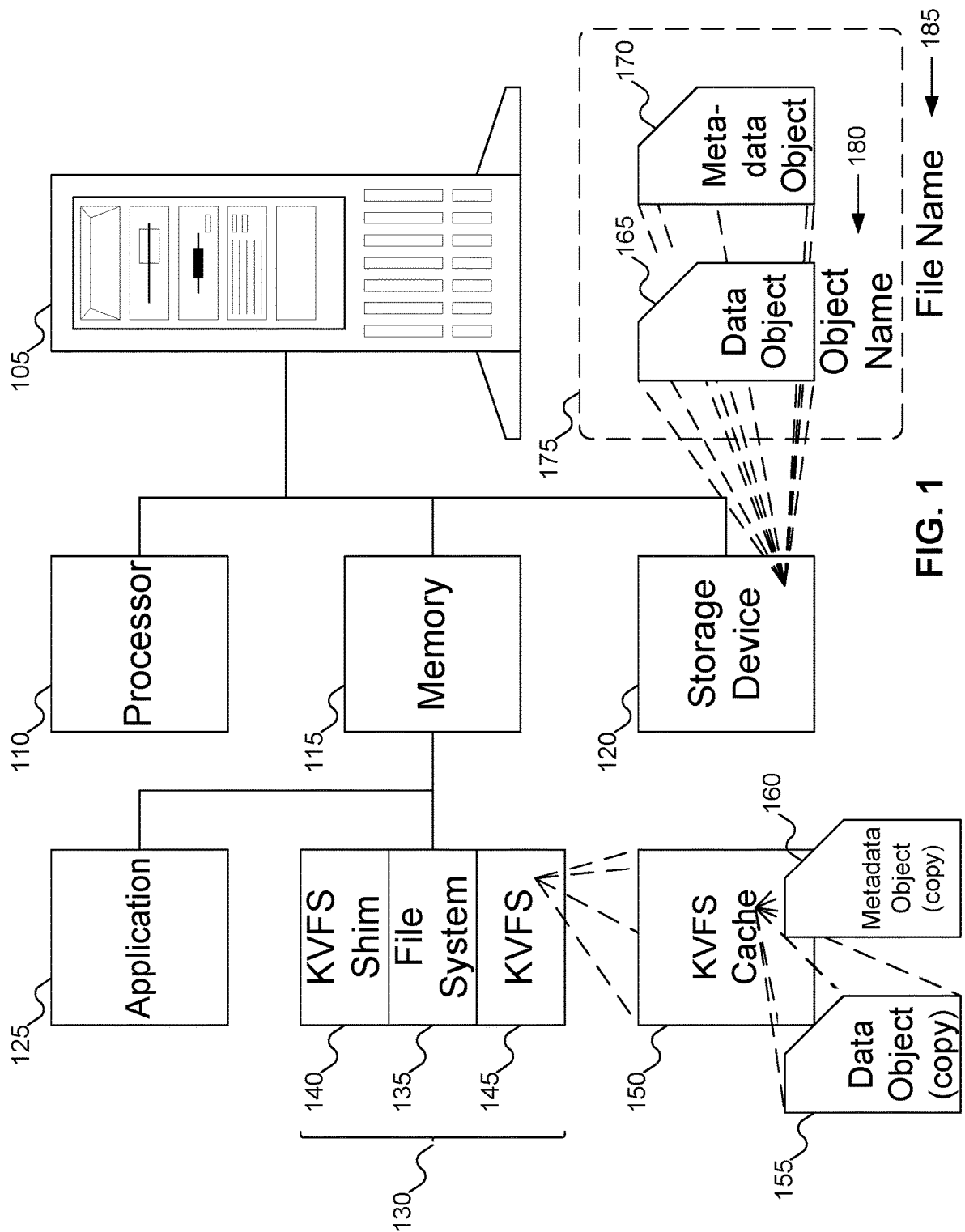
FIG. 1 shows a system enabling using the page cache of the operating system when accessing a key-value system storage device, according to an embodiment of the inventive concept.

Reference will now be made in detail to embodiments of the inventive concept, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first unit could be termed a second unit, and, similarly, a second unit could be termed a first unit, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Embodiments of the inventive concept include methods for accessing a key-value that leverage an operating system's page cache (or buffer cache) to accelerate data access. A key-value request (or key-value system command) may be transformed to a file system request that may utilize the page cache. Embodiments of the inventive concept may also transform file system requests to key-value system requests: for example, to transform the page cache ReadPage command to key-value system GET and PUT commands. To facilitate these transformations, a key-value file system (KVFS) may include its own internal page cache, which may further reduce the number of access requests made of the storage device, and may also address partial reads and writes. The storage device may also store a metadata object that supports a file system interface and functionality while requiring a minimal overhead.

By utilizing the existing operating system page cache, embodiments of the inventive concept may improve the data access performance of key-value applications. This result has the added benefit of enabling multiple applications to share the page cache and to permit cached data to persist across application restarts.

Embodiments of the inventive concept enable use of standard operating system page cache and buffer cache behaviors without requiring changes to any generic part of an operating system. To achieve these results, embodiments of the inventive concept introduce two new components:

1) Within the user space of the operating system, a new Key-Value File System (KVFS) shim may be introduced. The KVFS shim may override a small subset of methods to which an application may link, implementing the changes transparently to the application.

2) Within the file system layer of the operating system, a KVFS driver (sometimes referred to as the KVFS layer, or just KVFS) may be introduced. The KVFS driver may conform to standard file system interfaces (such as BSD's Vnode or Linux's VFS interface) required by the operating system, and translate file system requests to key-value system requests.

FIG. 1 shows a system enabling using the page cache of the operating system when accessing a key-value system storage device, according to an embodiment of the inventive concept. In FIG. 1, computer 105 is shown as including processor 110, memory 115, and storage device 120. Processor 110 may be any variety of processor: for example, an Intel Xeon or Intel Celeron processor. Memory 115 may be any variety of memory, such as non-volatile memory (e.g., flash memory) or Static Random Access Memory (RAM), but is typically Dynamic RAM. Storage device 120 may be any variety of storage device that does not use a conventional block interface. Embodiments of the inventive concept include Solid State Drives (SSDs) offering a key-value (object) interface, but other embodiments of the inventive concept may support other types of storage devices, other types of interfaces, or both. In the description below, in general any reference to "key-value", whether in the context of an interface, command, or other context, may be replaced with any other alternative appropriate to a different specialized storage device 120.

Memory 115 may include application 125, which may be any variety of application. In some embodiments of the inventive concept, application 125 may be an application designed to utilize a key-value interface of storage device 120, but in other embodiments of the inventive concept, application 125 may be an application utilizing a conventional file system. As is described below with reference to FIG. 3B, embodiments of the inventive concept may permit an application utilizing conventional file system commands to access a storage device, such as storage device 120, offering a key-value interface.

Memory 115 may also include operating system 130, which may include file system 135. File system 135 may be a conventional file system, just as operating system 130 may be a conventional operating system including a page cache. (The term "page cache" is intended to encompass any cache offered by an operating system to store data for applications, be it a more conventional buffer cache or a more modern Linux-type page cache.) To enable transition between conventional file system commands and key-value system commands, operating system 130 may include key-value file system (KVFS) shim 140 and KVFS 145. KVFS shim 140 may translate key-value system commands to file system commands, which file system 135 may then process. KVFS may translate file system commands back to key-value system commands to interface with storage device 120 (which, as described above, offers a key-value system interface rather than a conventional block interface). KVFS shim 140 may be implemented as functions that override library functions normally called by application 125.

Since the specifics of the implementation of KVFS shim 140 and KVFS 145 may depend on variables including the particulars of operating system 130 and file system 135 the commands accepted by storage device 120, implementation may vary across different installations. In some embodiments of the inventive concept, KVFS shim 140 and KVFS 145 may be implemented using pluggable functions, with KVFS shim 140 and KVFS 145 both including a complete set of all possible functions. Then, for a particular implementation, specific functions may be activated, with the remaining functions left inactive. For example, KVFS shim 140 and KVFS 145 may include functions to handle all possible file system commands for all possible file systems 135, and functions to handle all possible key-value system commands for all possible storage devices 120. Then, when KVFS shim 140 and KVFS 145 are installed on computer 105, the functions that process the particular commands recognized by file system 135 and storage device 120 may be activated, implementing the particular KVFS shim 140 and KVFS 145 needed for computer 105.

While operating system 130 may include its own page cache, further enhancements may be made to computer 105 to reduce the need to access data from storage device 120. For example, KVFS 145 may include KVFS cache 150. KVFS cache 150 may store copies 155 and 160 of data and metadata. Copies 155 and 160 may be copies of data object 165 and metadata object 170 stored in storage device 120. As will be described further below with reference to FIGS. 3A-8, data object 165 may store the underlying data, and metadata object 170 may store the metadata of a file. Thus, together, data object 165 and metadata object 170 may establish file 175.

One reason to include KVFS cache 150 is to address partial reads and writes. Key-value system semantics may specify that objects are read or written in their entirety: partial data reads and writes might not be permitted. Thus, if any data is needed from data object 165 stored in storage device 120, the entirety of data object 165 must be read. Similarly, if any data is to be written to data object 165 stored in storage device 120, the entirety of data object 165 must be written.

But file system semantics may permit partial data reads and writes. For example, a file system command might only want to read a data field from data object 165. Since key-value system semantics would require the entirety of data object 165 to be read regardless of how much data is actually to be used, the remaining data may be cached somewhere in case it is needed in the future, avoiding the need to re-read data object 165. But since the file system command from operating system 130 only requests the specific data required by application 125, the page cache within operating system 130 would not cache the remaining data from data object 165. Thus, KVFS cache 150 provides a means to store data that would otherwise be discarded, even though it might be needed at some point in the future.

Of course, this means that KVFS cache 150 is a cache, with the limitations that exist for any cache. KVFS cache 150 will have a finite size determined by the space allocated to KVFS cache 150. If KVFS cache 150 is asked to store more data than for which it has space allocated, KVFS cache 150 will need to rotate data out of KVFS cache 150. KVFS cache 150 may use any desired algorithm for expunging older data to make room for new data, such as Least Frequently Used (LFU), Least Recently Used (LRU), or any other schedule.

One consequence of KVFS cache 150 expunging older data is that for some object, KVFS cache 150 might contain only part of its data. For example, consider a situation where data is requested from a database that is 200 MB in size. Since objects are written and read in their entirety from key-value system storage devices, a single object, roughly 200 MB in size, stores the database. So when part of the database is to be read, the entire 200 MB of the database would be loaded into KVFS cache 150. Later, assume a request comes to read a file that is 10 KB in size, but KVFS cache 150 is now full. For whatever reason, KVFS cache 150 decides to evict 10 KB worth of the database to make room for the requested file.

Now further assume that another requests comes for data from the database. With more than 199 MB of the database still in KVFS cache 150, the odds are likely that the requested data is still present in KVFS cache 150. If so, then the request may be satisfied from KVFS cache 150 without accessing storage device 120. But if the requested data happens to be part of the data evicted from KVFS cache 150 when the smaller file was read, KVFS 145 will need to request the entire 200 MB database object again.

Data writes may be handled similarly. When data is to be written, if the data being replaced is stored in KVFS cache 150, then the data within KVFS cache 150 may be updated and KVFS 145 may return a result. Later, KVFS 145 may write the data from KVFS cache 150 to storage device 120, to ensure the data is updated in the more permanent storage, after which the data in KVFS cache 150 may be flagged as being available to erase. Of course, if new data is to be loaded into KVFS cache 150 when KVFS cache 150 is full, KVFS cache needs to know which data has been written to storage device 120 and which has not, so that data may be flushed to storage device 120 if those pages are to be expunged from KVFS cache 150. So KVFS cache 150 would need to track dirty bits for each page in KVFS cache 150. Another alternative, of course, is to ensure that the data object is written to storage device 120 before KVFS returns a result of the data write operation: in that situation, KVFS cache 150 may be certain that any data may be expunged safely.

Data object 165 may have object name 180. Object name 180 is data that may be used to uniquely locate data object 165 on storage device 120. In a similar way, metadata object 170 may have its own name, although as described below with reference to FIGS. 5 and 6, the name of metadata object 170 may be derived from name 180 of data object 165. By making the name of metadata object 170 a derivative of object name 180, metadata object 170 may always be located knowing object name 180.

File 175 may also have file name 185. File name 185 is independent of object name 180: file name 185 may change without changing object name 180, and vice versa.

Figure 2:
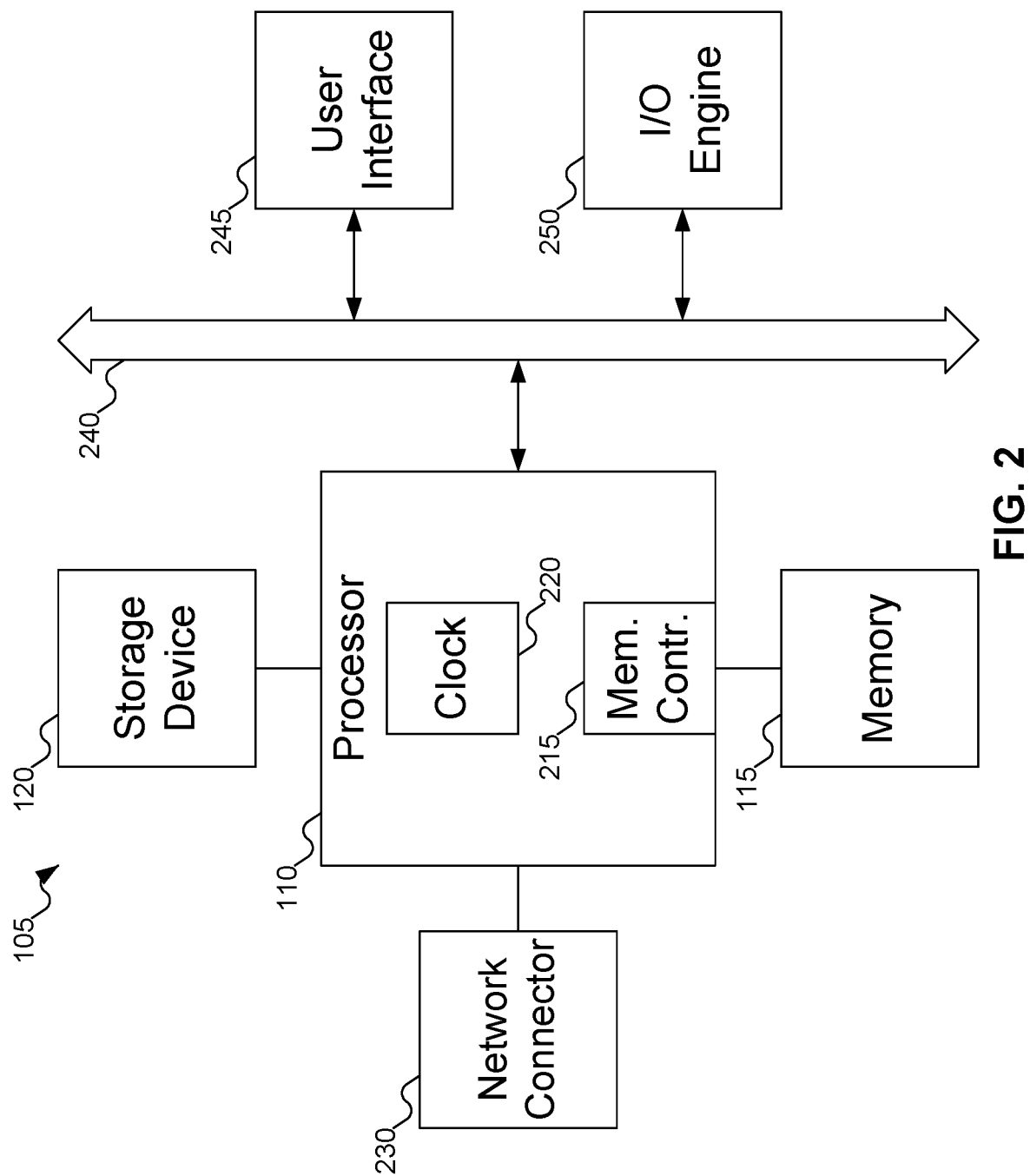
FIG. 2 shows additional details of the computer of FIG. 1.

FIG. 2 shows additional details of computer 105 of FIG. 1. Referring to FIG. 2, typically, machine or machines 105 include one or more processors 110, which may include memory controller 205 and clock 210, which may be used to coordinate the operations of the components of machine or machines 105. Processors 110 may also be coupled to memory 115, which may include random access memory (RAM), read-only memory (ROM), or other state preserving media, as examples. Processors 110 may also be coupled to storage devices 120, and to network connector 215, which may be, for example, an Ethernet connector or a wireless connector. Processors 110 may also be connected to a bus 220, to which may be attached user interface 225 and input/output interface ports that may be managed using input/output engine 230, among other components.

Figure 3A:
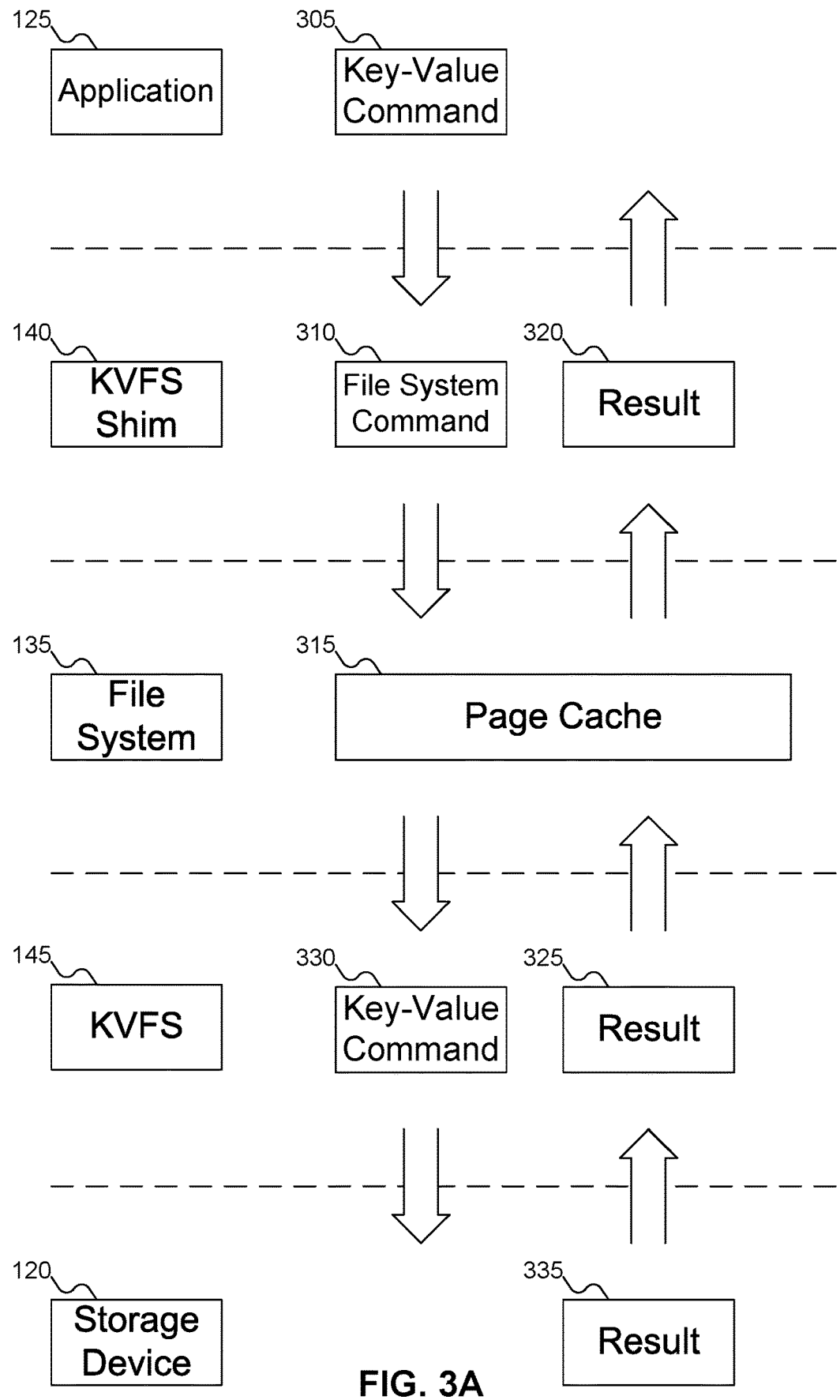
FIGS. 3A-3B show the flow of commands and data across the layers of the computer of FIG. 1.
Figure 3B:
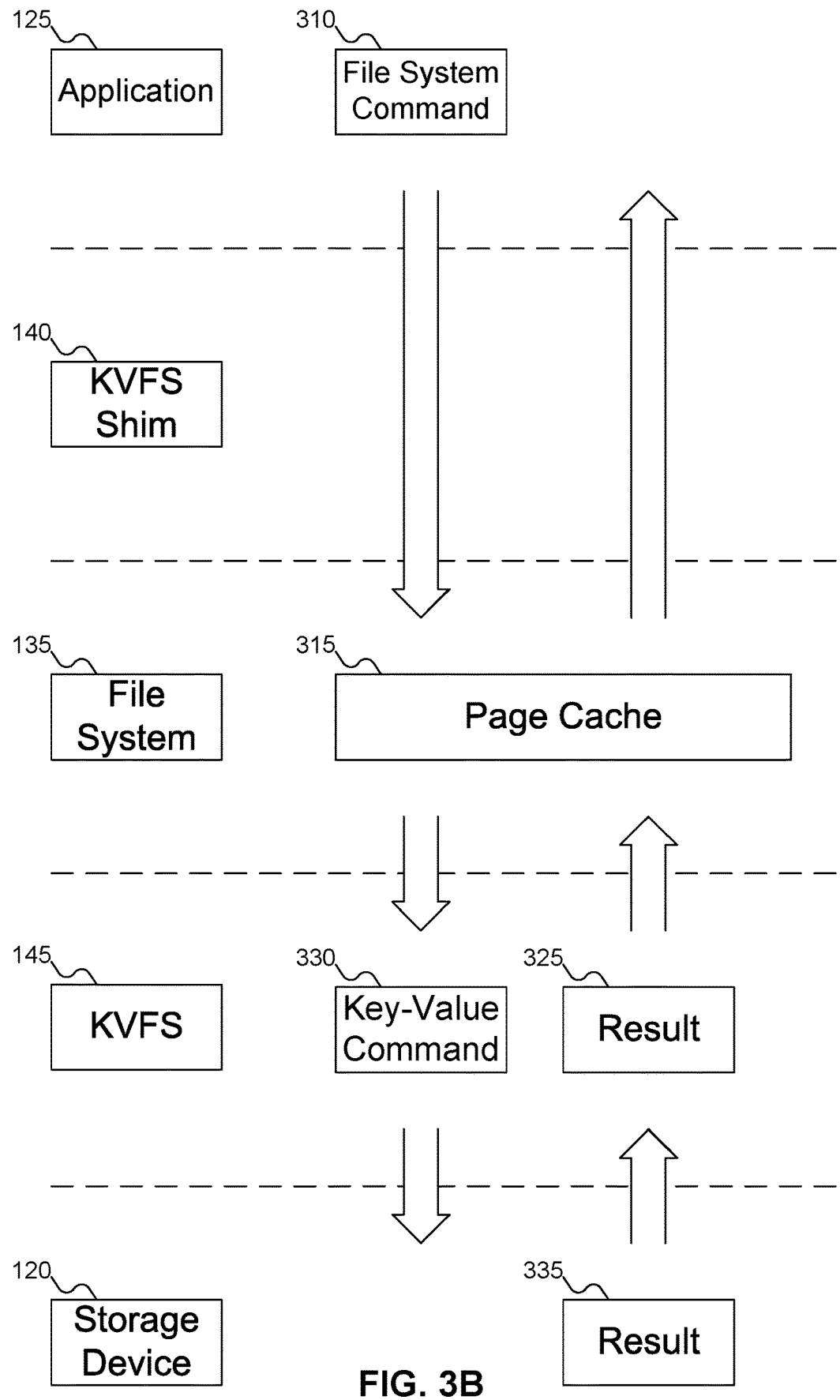

FIGS. 3A-3B show the flow of commands and data across the layers of computer 105 of FIG. 1. In FIG. 3A, one embodiment of the inventive concept is shown, in which application 125 may issue key-value system commands that would be recognized by storage device 120. When application 125 issues key-value system command 305, application 125 may use a library function. This library function may be overridden by KVFS shim 140, which may then receive key-value system command 305. KVFS shim 140 may then map key-value system command 305 to file system command 310. File system command 310 may be an analogous file system command to key-value system command 305, but one that may be processed by file system 135, part of operating system 130 of FIG. 1. File system 135 (or operating system 130 of FIG. 1, depending on the implementation of operating system 130 of FIG. 1 and file system 135) may access page cache 315 in an attempt to satisfy file system command 310. If page cache 315 may satisfy file system command 310, then file system 135 (or operating system 130 of FIG. 1) may return result 320 back to KVFS shim 140. KVFS shim 140 may then map result 320 into a form expected by application 125: application 125 is expecting a result for key-value system command 305, which might take a different form than that of a result for file system command 310.

If file system 135 (or operating system 130 of FIG. 1) may not satisfy file system command 310 using page cache 315, file system 135 may send file system command 310 on to KVFS 145. KVFS 145 may then attempt to satisfy file system command 310 using KVFS cache 150. If KVFS 145 may satisfy file system command 310 using KVFS cache 150, KVFS may return result 325. File system 135 (or operating system 130 of FIG. 1) may then make any needed updates to page cache 315 and may return result 325 (shown as result 320 in FIG. 3A) to KVFS shim 140, where processing may continue as described before.

KVFS 145 might also need to update storage device 120. For example, if file system command 310 updates the metadata for file 175 of FIG. 1, KVFS 145 may update metadata object 170 as stored on storage device 120. But whether KVFS 145 needs to make any changes to storage device 120 is dependent on the implementation of KVFS 145, storage device 120, and the specifics of file system command 310, and is not necessarily required for all file system commands 310.

If KVFS 145 may not satisfy file system command 310 using KVFS cache 150, KVFS 145 may map file system command 310 to key-value system command 330. It may be expected that key-value system command 330 will usually be identical to key-value system command 305 as issued by application 125, but it is possible that key-value system command 330 might differ somehow from key-value system command 305. KVFS 145 may then receive a result from storage device 120, which KVFS may return to file system 135 (or operating system 130 of FIG. 1) as result 335, after which processing may continue as described before. KVFS 145 may also update KVFS cache 150 of FIG. 1 based on the result received from storage device 120. For example, if file system command 310 involved renaming file 175 of FIG. 1, and KVFS cache 150 of FIG. 1 did not already store metadata object 170 of FIG. 1, KVFS 145 may issue key-value system command 330 to retrieve metadata object 170 of FIG. 1, store copy 160 of metadata object 170 of FIG. 1 in KVFS cache 150 of FIG. 1, and update copy 160 of metadata object 170 of FIG. 1 in KVFS cache 150 of FIG. 1. KVFS 145 may then issue additional second key-value system commands 330 to delete metadata object 170 of FIG. 1 from storage device 120 and to store a replacement metadata object 170 of FIG. 1 in storage device 120, so that storage device 120 includes updated metadata.

FIG. 3B is similar to FIG. 3A. But in other embodiments of the inventive concept, application 125 may issue file system command 310, rather than key-value system command 305 of FIG. 3A. For example, application 125 might be an application that is not designed to utilize the key-value interface offered by storage device 120, but instead expects to use conventional file system commands.

As application 125 issues conventional file system commands, KVFS shim 140 is not needed to translate key-value system commands into file system commands. As a result, file system 135 (or operating system 130 of FIG. 1) may utilize page cache 315 based on file system command 310. But KVFS 145 may still map file system command 310 to key-value system command 330. By using KVFS 145 to map file system command 310 to key-value system command 330, KVFS 310 may make it appear to file system 135 that storage device 120 uses conventional block storage, when in fact storage device 120 actually uses object storage. In such embodiments of the inventive concept, application 125 may leverage the benefits of page cache 315, despite the fact that storage device 120 does not use conventional block storage. Note that the operations of file system 135 (and/or operating system 130 of FIG. 1), KVFS 145 (and KVFS cache 150 of FIG. 1), and storage device 120 are identical to those described in FIG. 3A.

While FIGS. 3A and 3B are presented as alternative embodiments of the inventive concept, embodiments of the inventive concept are represented in FIGS. 3A and 3B may also be combined. For example, embodiments of the inventive concept may operate as shown in FIG. 3A when an application 125 issues key-value system commands such as key-value system command 305 of FIG. 3A, and may operate as shown in FIG. 3B when an application 125 issues file system commands such as file system command 310 of FIG. 3B. As a result, page cache 315 and KVFS cache 150 of FIG. 1 may be leveraged across applications 125 to use either key-value system commands or file system commands, and data may be shared across such applications 125 within page cache 315 and KVFS cache 150 of FIG. 1.

Figure 4:
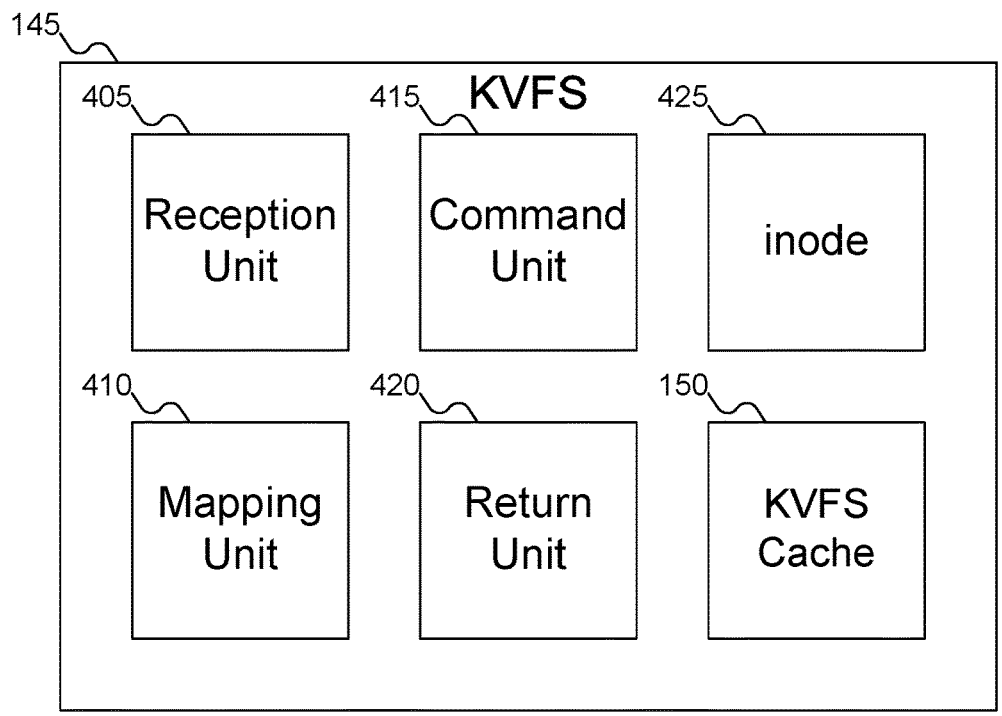
FIG. 4 shows details of the Key-Value File System (KVFS) layer of FIG. 1.

FIG. 4 shows details of Key-Value File System (KVFS) layer 145 of FIG. 1. In FIG. 4, Aside from KVFS cache 150, which was described above with reference to FIGS. 1 and 3A-3B, KVFS 145 is shown as including reception unit 405, mapping unit 410, command unit 415, and return unit 420. Reception unit 405 may receive commands from other levels in operating system 130 of FIG. 1, such as file system 135 of FIG. 1. Mapping unit 410 may map file system commands to key-value system commands. Command unit 415 may issue key-value system commands to storage device 120 of FIG. 1. And return unit 420 may return results to the calling level of operating system 130 of FIG. 1, such as file system 135 of FIG. 1. Note that not every unit is needed in response to all file system commands. For example, if a file system command may be satisfied from data resident in KVFS cache 150, mapping unit 410 and command unit 415 might not be needed to access information from storage device 120 of FIG. 1.

The mapping of file system commands to key-value system commands was discussed above with reference to FIGS. 3A-3B. To achieve this mapping, mapping unit 410 may include any desired mapping from file system commands to key-value system commands. For example, mapping unit 410 might include a table that specifies what key-value system command(s) correspond to a given file system command. Note that the association may be one-to-many: a single file system command might include multiple key-value system commands. For example, in a flash SSD, data may not be overwritten. Changing data involves invalidating the original data (which may be subject to garbage collection by the SSD whenever appropriate) and writing a new data object. Thus, changing any metadata for a file may require KVFS 145 to delete metadata object 170 of FIG. 1 (more accurately, KVFS 145 may invalidate metadata object 170 of FIG. 1 on storage device 120, and let storage device 120 perform garbage collection to free the space that was occupied by the old object) and to store a replacement metadata object.

It is worthwhile noting that a distinction may be drawn between the names of various data elements within the system. Returning momentarily to FIG. 1, data object 165 has object name 180, whereas file 175 has file name 185. (Metadata object 170 has an object name as well, as discussed below with reference to FIGS. 5-8. But as the name of metadata object 170 is an element that is strictly internal to the operation of computer 105, the name of metadata object 170 is not significant to this discussion.) Object name 180 identifies data object 165; file name 185 identifies file 175. File name 185 itself is metadata stored within metadata object 170: the representation shown in FIG. 1 is merely symbolic. File 175 is effectively an element within file system 135, whereas data object 165 is an element within the key-value system of storage device 120. Object name 180 and file name 185 are distinct: it would be highly unusual, if not outright impossible, for object name 180 and file name 185 to be the same.

Furthermore, object name 180 and file name 185 may each be modified without affecting the other. For example, if application 125 decides to rename file name 185, this change affects the contents of metadata object 170, but does not change object name 180. Alternatively, if object name 180 were to be changed, this would affect data object 165 (and would have an indirect effect on metadata object 170, as the object name for metadata object 170 would also change); but file name 185 would remain unchanged. Thus it is important to keep separate the concepts of object names and file names: they are related but distinct concepts.

Returning to FIG. 4, KVFS 145 may also include inode 425. inode 425 may be a data structure representative of a file. inode 425 may be a conventional inode as used in Unix-based systems, or inode 425 may be a novel data structure. inode 425 may store information about a file, such as file 175 of FIG. 1. Typically, inode 425 may store file metadata, such as file name 185, the date and time of file creation, the file's owner, etc. But inode 425 may include additional information, as appropriate to the implementation.

Figure 5:
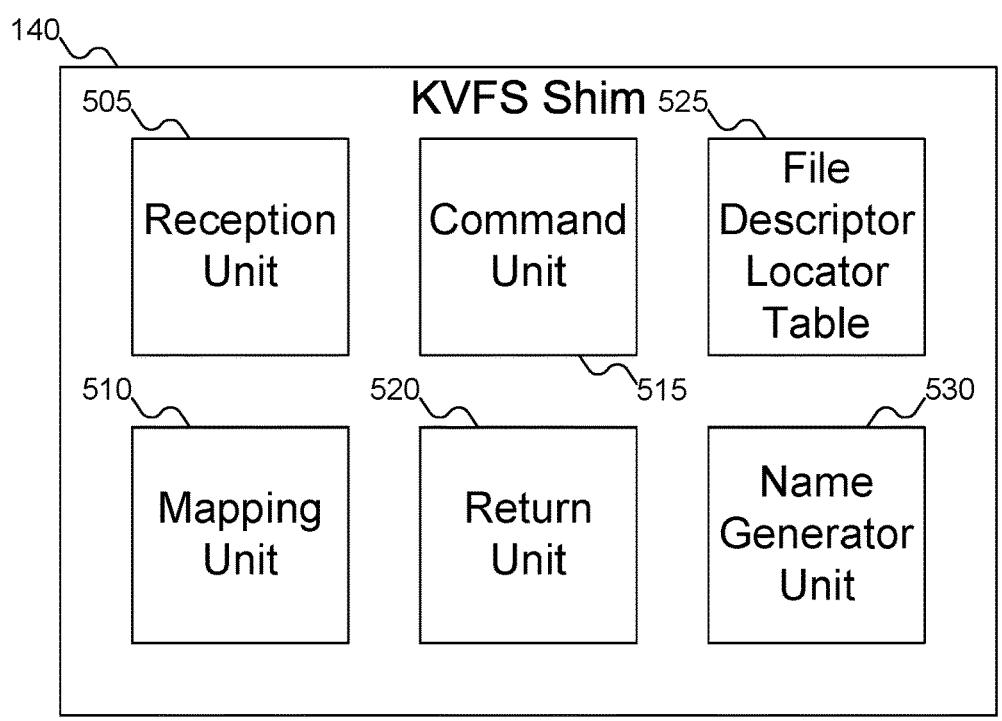
FIG. 5 shows details of the KVFS shim of FIG. 1.

FIG. 5 shows details of KVFS shim 140 of FIG. 1. In FIG. 5, KVFS shim 140 may include reception unit 505, mapping unit 510, command unit 515, and return unit 520. Reception unit 505 may receive commands from application 125 of FIG. 1. Mapping unit 510 may map key-value system commands to file system commands. Command unit 515 may issue file system commands to file system 135 of FIG. 1 (or operating system 130 of FIG. 1). And return unit 520 may return results to application 125 of FIG. 1. Note that unlike KVFS 145 of FIG. 4, KVFS shim 140 may not satisfy key-value system commands on its own, and sends file system commands to file system 135 of FIG. 1 (or operating system 130 of FIG. 1).

The mapping of key-value system commands to file system commands was discussed above with reference to FIGS. 3A-3B. To achieve this mapping, mapping unit 510 may include any desired mapping from key-value system commands to file system commands. For example, mapping unit 510 might include a table that specifies what file system command(s) correspond to a given key-value system command. But in contrast to mapping unit 410 of FIG. 4, mapping unit 510 in KVFS shim 140 generally has a simpler implementation. While there are numerous file system commands that may be issued to file system 135 of FIG. 4, there are only three key-value system commands that may be issued to a key-value storage device: GET, PUT, and DELETE. A GET command reads data from the storage device; a PUT command writes data to the storage device; and a DELETE command invalidates data on the storage device. Thus the implantation of mapping unit 510 tends to be simpler, given the fewer number of commands that may be issued to key-value storage devices. In addition, file system 135 of FIG. 1 typically has analogous commands for reading, writing, and deleting data, making the mapping from key-value system command to file system command relatively simple. Nevertheless, depending on the specifics of operating system 130 of FIG. 1 and storage device 120 of FIG. 1, a single key-value system command might map to multiple file system commands.

KVFS shim 140 may also include file descriptor locator table 525. A file descriptor is an internal mechanism for accessing data in a file (either for writing or reading). KVFS shim 140 may store identifiers for file descriptors in file descriptor lookup table 525: a located file descriptor may then be passed to file system 135 of FIG. 1 as an argument to a file system command. Without file descriptor lookup table 525, either KVFS shim 140 would need to query operating system 130 of FIG. 1 for a file descriptor every time a file needed to be accessed, or else open a file, perform any necessary commands, and then close the file for every key-value system command. But both of these approaches are time-intensive. By storing file descriptors in file descriptor lookup table 525, KVFS shim 140 may quickly determine the appropriate file descriptor for a file system command corresponding to a received key-value system command. File descriptor lookup table 525 is described further below with reference to FIG. 7.

KVFS shim 140 may also include name generator unit 530. As describe above, metadata objects have names (necessary to be able to access the object), but metadata object names only matter when converting from objects to files, and therefore the names of metadata objects only matter within KVFS shim 140 and KVFS 145 of FIG. 1. As a result, almost any desired algorithm for generating names for metadata objects may be used.

There are a few desired features for a procedure to generate names for metadata objects. First, the procedure should be deterministic: given the same data, the same metadata name should always result. Second, the procedure should avoid collisions: given different data, different metadata names should result. Third, as object names may have any length, the procedure should be able to process data of any potential length. These are all properties that should be present in name generating unit 530, which may generate a name for metadata object 170 of FIG. 1, given object name 180.

Figures 6, 7:
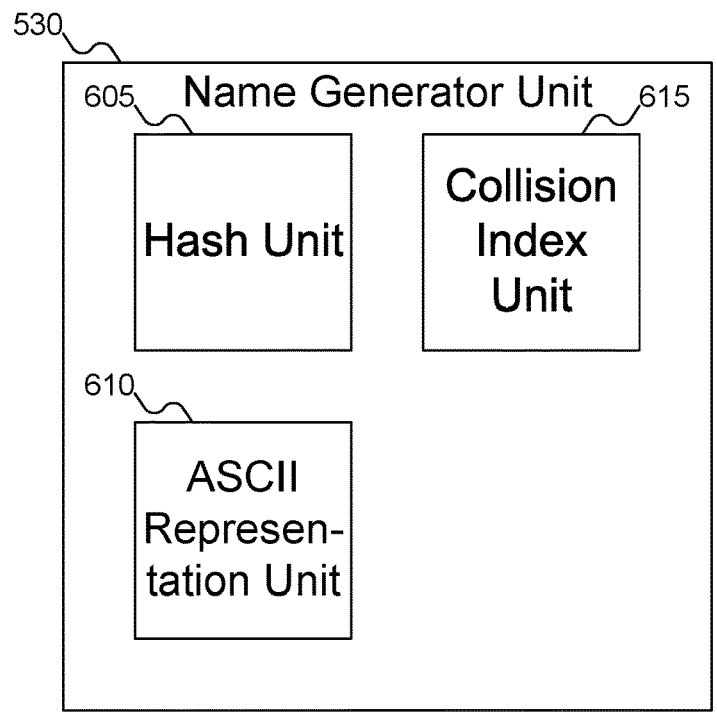
FIG. 6 shows details of the name generator unit of FIG. 5.
FIG. 7 shows details of the file descriptor lookup table of FIG. 5.

FIG. 6 shows details of name generator unit 530 of FIG. 5, which may generate a name for metadata object 170 of FIG. 1 from object name 180 of FIG. 1. By starting with object name 180, name generator unit 530 may avoid the complication of trying to consistently generate the same name for metadata object 170 of FIG. 1 from inconsistent input. In FIG. 6, name generator unit 530 may include hash unit 605, ASCII representation unit 610, and collision index unit 615. Hash unit 605 may perform a hash on object name 180. Cryptographic hash algorithms, such as SHA-1, offer most of the properties that are desired for name generation, and therefore make an excellent choice for generating names for metadata objects. But there are some characters (such as a slash, often used to separate the file from its container) that may not be part of a file name. Since the result of a cryptographic hash algorithm is not necessarily usable as a file name, ASCII representation unit 610 may take the result of hash unit 605 and generate an ASCII representation of that result. ASCII representation unit 610 may eliminate any problematic characters from the result of hash unit 605.

Of course, a cryptographic hash algorithm may not guarantee that there are no collisions between hash results. For example, SHA-1 produces a 160-bit hash result, regardless of the size of the input data. Thus if SHA-1 were given more than 160 bits of input data, SHA-1 would produce a 160-bit hash. For any input size greater than 160 bits, since there are more possible inputs than there are outputs, the possibility of collisions still exists, even if the likelihood is small. To address this possibility, collision index unit 615 may add a collision index to the ASCII representation, in case a collision occurs. The combination of an ASCII representation of the result of hash unit 605 and a collision index may avoid any possible collision in the generation of a name for metadata object 170 of FIG. 1.

Once the name for metadata object 170 of FIG. 1 has been generated, KVFS shim 140 of FIG. 1 and KVFS 145 of FIG. 1 may use this name to access metadata object 170 of FIG. 1. By sending a PUT, GET, or DELETE request to storage device 120 of FIG. 1 with the generated name for metadata object 170 of FIG. 1, KVFS shim 140 of FIG. 1 and KVFS 145 of FIG. 1 may access and use metadata object 170 of FIG. 1 reliably and consistently.

FIG. 7 shows details of file descriptor lookup table 525 of FIG. 5. As described above with reference to FIG. 5, file descriptor lookup table 525 provides a mechanism for KVFS shim 140 of FIG. 1 to access a file descriptor for a given file. In FIG. 7, file descriptor lookup table 525 may include any number of associations of hashes and file descriptors. For example, hash 705 is associated with file descriptor 710, hash 715 is associated with file descriptor 720, and hash 725 is associated with file descriptor 730. In FIG. 7, file descriptor lookup table 525 shows three such associations, but embodiments of the inventive concept may support any number of such associations. Given a hash value, KVFS shim 140 may find a corresponding file descriptor, if it exists in file descriptor lookup table 525.

Hashes 705, 715, and 725 may store file descriptors for files as managed by operating system 130 of FIG. 1. If no file descriptor has yet been opened, KVFS shim 140 of FIG. 1 may open a file and receive a file descriptor back. KVFS shim 140 of FIG. 1 may then add the hash value and the file descriptor to file descriptor lookup table 525 for later use.

KVFS shim 140 of FIG. 1 may use the name for metadata object 170 of FIG. 1 as the hash for lookup in file descriptor lookup table 525. Since the name for metadata object 170 of FIG. 1 may be generated by using hash unit 605 of FIG. 6 (along with other procedures), the likelihood that two different file descriptors would be associated with the same hash value in file descriptor lookup table 525 are effectively zero.

Figure 8:
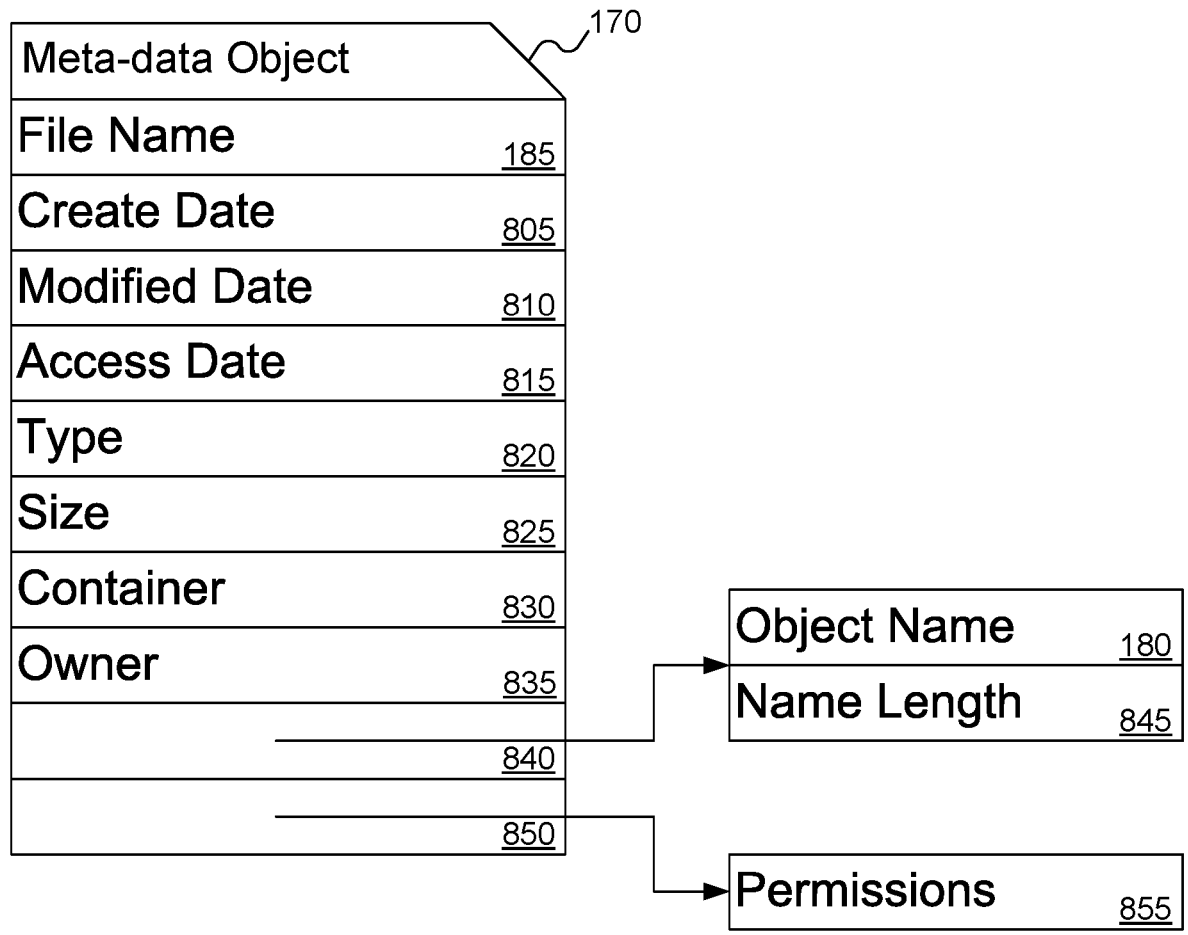
FIG. 8 shows details of the structure of the metadata object of FIG. 1.

FIG. 8 shows details of an example structure of metadata object 170 of FIG. 1. In FIG. 8, metadata object 170 may include various data fields. These data fields may include file name 185, date 805 ("date" as used herein is intended to include both the date and time) that file 175 of FIG. 1 was created, date 810 that file 175 of FIG. 1 was last modified, date 815 that file 175 of FIG. 1 was last accessed, type 820 for file 175 of FIG. 1 (e.g., executable, document, text file, or others), size 825 of file 175 of FIG. 1, container 830 that stores file 175 of FIG. 1, and owner 835 of file 175 of FIG. 1.

Metadata object 170 may also include object name 180. By including object name 180, access to metadata object 170 gives the system a way back to data object 165 (recall that the name for metadata object 170 may be generated from object name 180). In some embodiments of the inventive concept, metadata object 170 may include object name 180 directly. To make access to metadata object 170 efficient, metadata object 170 should have a fixed size, which means that the space allocated for object name 180 would have to be fixed in advance. But since object names are potentially unbounded in length, including object name 180 within metadata 170 may create a complication: object name 180 would need to be no longer than the size of the field allocated for object name 180 within metadata object 170. In practice, this is unlikely to be a problem: the field allocated for name 180 may include any desired number of characters: 200, 1000, 10,000, or more. But the possibility of field overflow does exist, which could create an error within operating system 130 of FIG. 1.

As an alternative, as shown in FIG. 8, metadata object 170 may include pointer 840, which may point to where object name 180 is stored. Once the system knows where object name 180 is stored and length 845 of object name 180, the system may retrieve object name 180. The reason FIG. 8 shows metadata object 170 including a pointer to name length 845 is that reading a fixed size of data is more efficient than reading data of unknown size. While FIG. 8 shows name length 845 as stored with object name 180, in other embodiments of the inventive concept name length 845 may be stored within metadata object 170.

Metadata object 170 may also include pointer 850 to permissions 855. Permissions 855 specify what permissions exist for data object 165 of FIG. 1. The structure of permissions 855 may vary depending on operating system 130 of FIG. 1. For example, in a Unix-based system, permissions 855 may specify whether the owner of file 175 of FIG. 1, other users in the group including the owner of file 175 of FIG. 1, and whether others may read, write, and execute the file. Other operating systems specify permissions 855 in other ways. While FIG. 8 shows permissions 855 being accessed via pointer 850 from metadata object 170, in other embodiments of the inventive concept permissions 855 may be stored within metadata object 170.

Figure 9A:
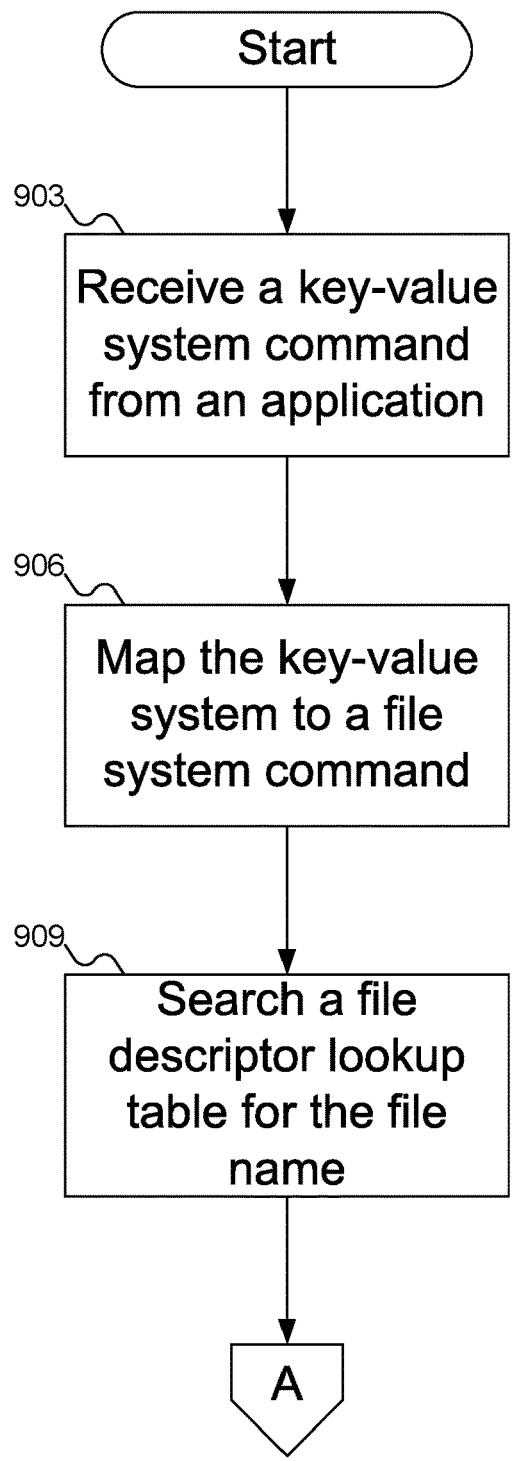
FIGS. 9A-9E show a flowchart of an example procedure for processing a command using the computer of FIG. 1, according to an embodiment of the inventive concept.
Figure 9B:
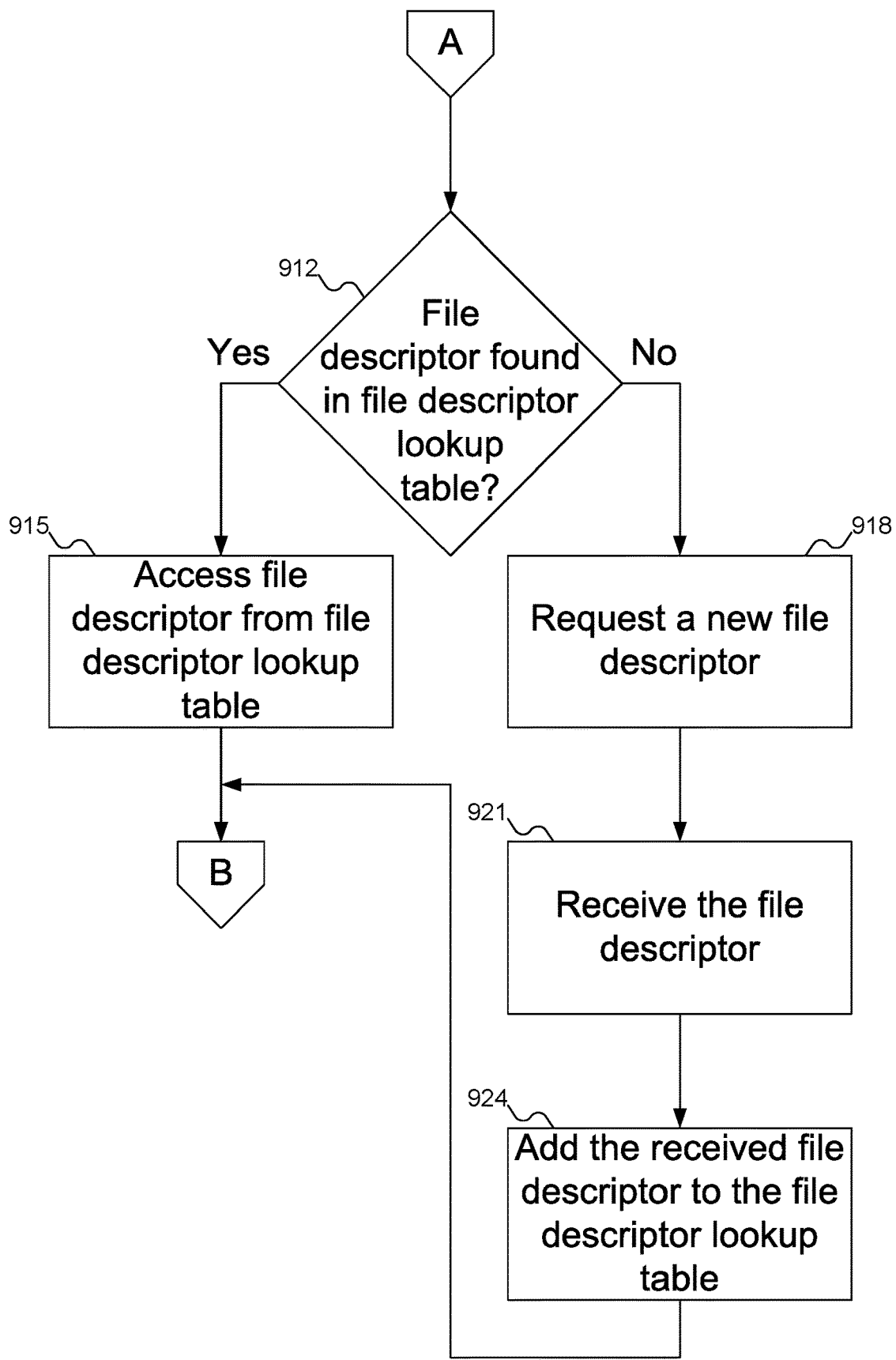
Figure 9C:
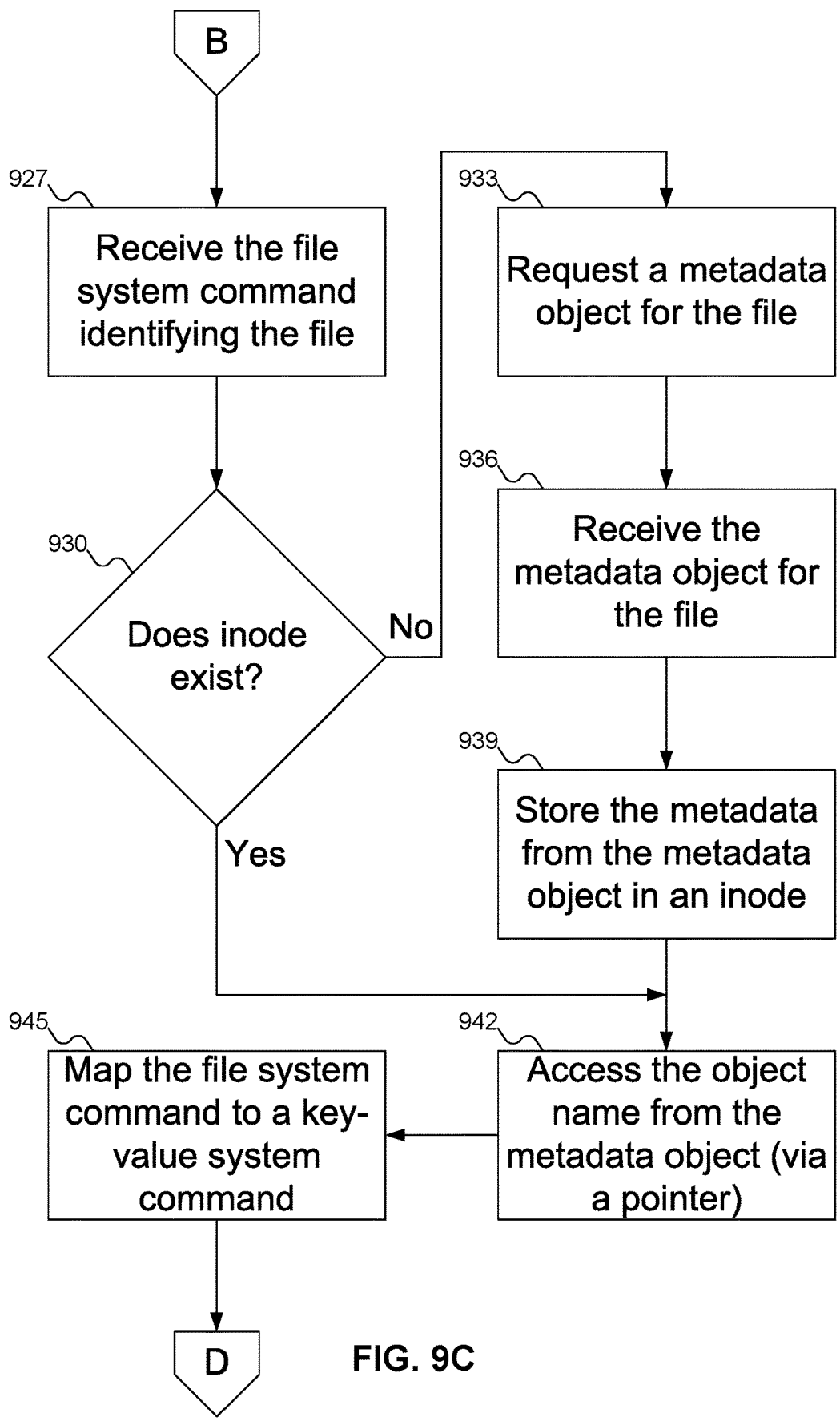
Figure 9D:
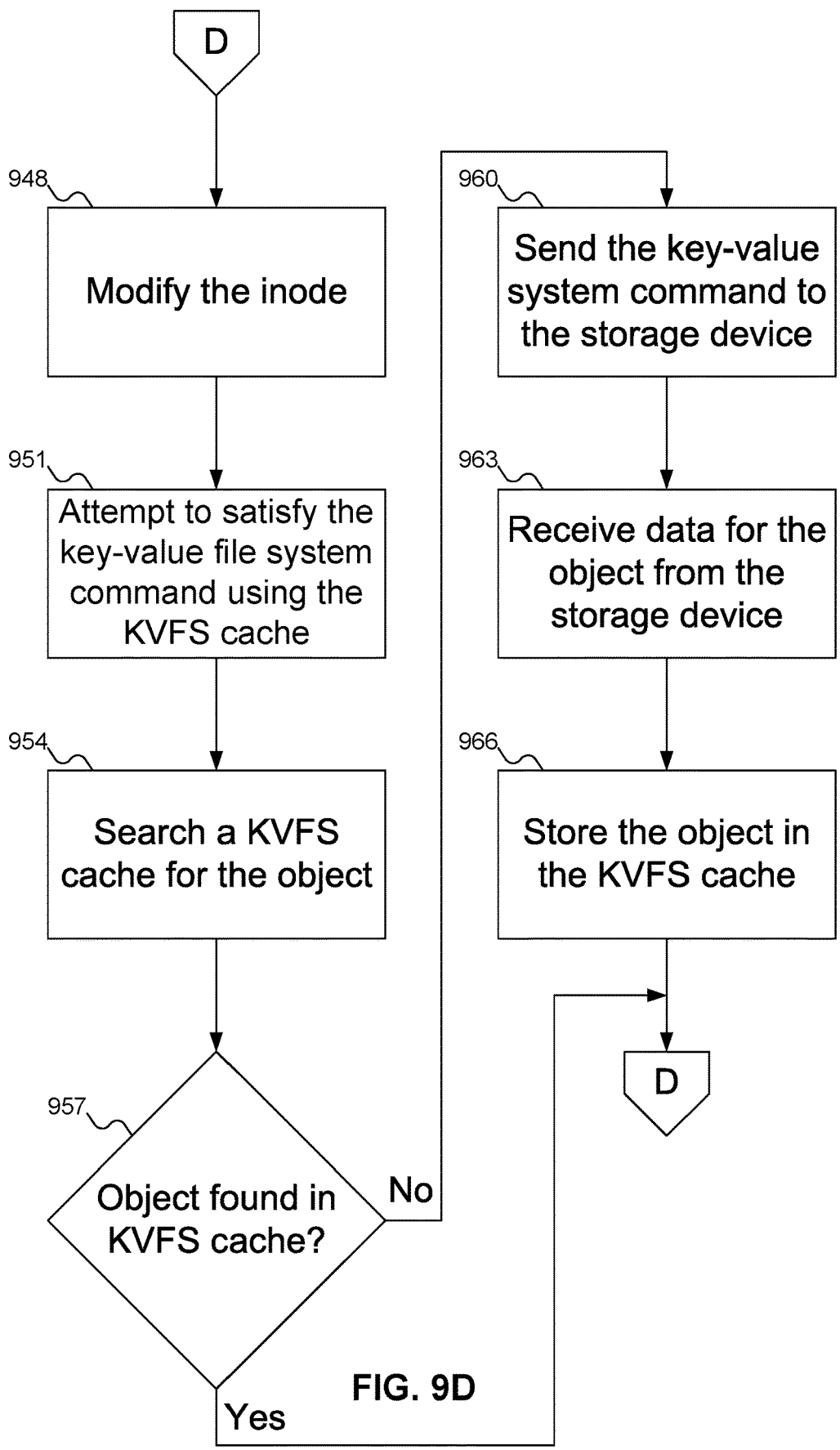
Figure 9E:
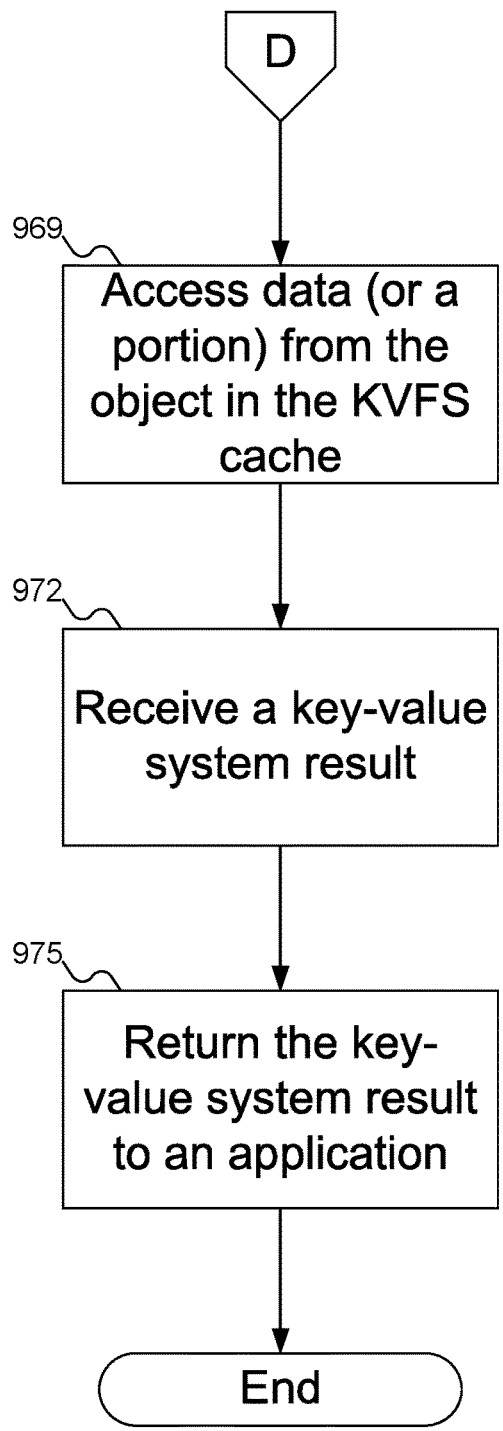

FIGS. 9A-9E show a flowchart of an example procedure for processing a command using computer 105 of FIG. 1, according to an embodiment of the inventive concept. In FIG. 9A, at block 903, KVFS shim 140 of FIG. 1 may receive key-value system command 305 of FIG. 3A from application 125 of FIG. 1. At block 906, KVFS shim 140 of FIG. 1 may map key-value system command 305 of FIG. 3A to file system command 310 of FIG. 3A. At block 909, KVFS shim 140 of FIG. 1 may search file descriptor lookup table 525 of FIG. 5 to see if the desired file has previously been opened. As described above with reference to FIG. 6, this search may use a name for metadata object 170 of FIG. 1 generated by name generator unit 530 of FIG. 5.

At block 912 (FIG. 9B), KVFS shim 140 of FIG. 1 may determine if file descriptor lookup table 525 of FIG. 5 contains the desired file descriptor. If file descriptor lookup table 525 of FIG. 5 contains the desired file descriptor, then at block 915 KVFS shim 140 of FIG. 4 may access the desired file descriptor from file descriptor lookup table 525 of FIG. 5. Otherwise, at block 918, KVFS shim 140 may request a new file descriptor from operating system 130 of FIG. 1 by opening the desired file. At block 921, KVFS shim 140 of FIG. 1 may receive the new file descriptor, and at block 924, KVFS shim 140 of FIG. 1 may add the new file descriptor to file descriptor lookup table 525 of FIG. 5 for future use.

Either way, once KVFS shim 140 of FIG. 1 has the desired file descriptor, at block 927 (FIG. 9C), KVFS 145 of FIG. 1 may receive file system command 310 of FIG. 1 from file system 135 of FIG. 1 (more generally, from operating system 130 of FIG. 1). This block may involve KVFS shim 140 of FIG. 1 sending file system command 310 of FIG. 3A to operating system 130 of FIG. 1, to attempt to use page cache 315 of FIG. 3A to satisfy the request; if page cache 315 of FIG. 3A may not satisfy the request, then operating system 130 of FIG. 1 may forward file system command 310 of FIG. 3A to KVFS 145 of FIG. 1.

At block 930, KVFS 145 may check to see if inode 425 of FIG. 4 exists that stores the desired metadata. If not, then at block 933, KVFS 145 of FIG. 1 may request metadata for file 175 of FIG. 1 from storage device 120 of FIG. 1 (more specifically, KVFS 145 of FIG. 1 may request metadata object 170 of FIG. 1 from storage device 120 of FIG. 1). At block 936, KVFS 145 of FIG. 1 may receive metadata object 170 of FIG. 1 for file 175 of FIG. 1 from storage device 120 of FIG. 1. At block 939, KVFS 145 of FIG. 1 may store the metadata in inode 425 of FIG. 4.

At block 942, regardless of whether or not inode 425 of FIG. 4 exists that stores the desired metadata, KVFS 145 of FIG. 1 may access object name 180 of FIG. 1 from metadata object 170 of FIG. 1 or from inode 425 of FIG. 4. At block 945, KVFS 145 of FIG. 1 may map file system command 310 of FIG. 3A to key-value system command 330 of FIG. 3A.

At block 948 (FIG. 9D), KVFS 145 of FIG. 1 may modify inode 425 of FIG. 4, if file system command 310 of FIG. 3A modifies the metadata of file 175 of FIG. 1 in some way. At block 951, KVFS 145 of FIG. 1 may attempt to satisfy key-value system command 330 of FIG. 3A using KVFS cache 150 of FIG. 1.

At block 954, KVFS 145 of FIG. 1 may search KVFS cache 150 of FIG. 1 to see if KVFS cache 150 of FIG. 1 stores the desired data. At block 957, KVFS 145 of FIG. 1 determines if KVFS cache 150 of FIG. 1 stores the desired data. If data object 165 of FIG. 1 (or some pertinent portion of data object 165 of FIG. 1) is not stored in KVFS cache 150 of FIG. 1, then at block 960 KVFS 145 of FIG. 1 may send key-value system command 330 of FIG. 3A to storage device 120 of FIG. 1 to retrieve data object 165 of FIG. 1. At block 963, KVFS 145 of FIG. 1 may receive data object 165 of FIG. 1 from storage device 120, and at block 966, KVFS 145 of FIG. 1 may store copy 155 of FIG. 1 of data object 165 of FIG. 1 in KVFS cache 150 of FIG. 1. This storage block, of course, might involve expunging some data from KVFS cache 150 of FIG. 1, to make room for the new data. KVFS 1405 of FIG. 1 may use any desired algorithm to select what data to expunge from KVFS cache 150 of FIG. 1.

At this point, KVFS 145 of FIG. 1 may be certain that KVFS cache 150 of FIG. 1 stores the desired data. At block 969 (FIG. 9E), KVFS 145 of FIG. 1 may access the data or portion thereof from copy 155 of FIG. 1 of data object 165 of FIG. 1 from KVFS cache 150 of FIG. 1. If data is being written, this access operation may involve either deleting data object 165 of FIG. 1 from storage device 120 of FIG. 1 and writing a new data object, or merely flagging the page in KVFS cache 150 of FIG. 1 as dirty (so that the page may be flushed to storage device 120 of FIG. 1 at a later time). At block 972, KVFS 145 of FIG. 1 may return result 335 of FIG. 3A to operating system 130 of FIG. 1, which eventually propagates up to application 125 of FIG. 1 as result 320 of FIG. 3A at block 975.

The above description is very complicated, as it views the operations of all levels within operating system 130 of FIG. 1: KVFS shim 140 of FIG. 1, file system 135 of FIG. 1, and KVFS 145 of FIG. 1. Reviewing the operations at KVFS shim 140 of FIG. 1 and KVFS 145 of FIG. 1 separately might be beneficial. (Since file system 135 of FIG. 1 remains unchanged in embodiments of the inventive concept, no analysis of the operations of file system 135 of FIG. 1 is provided below.)

Figure 10A:
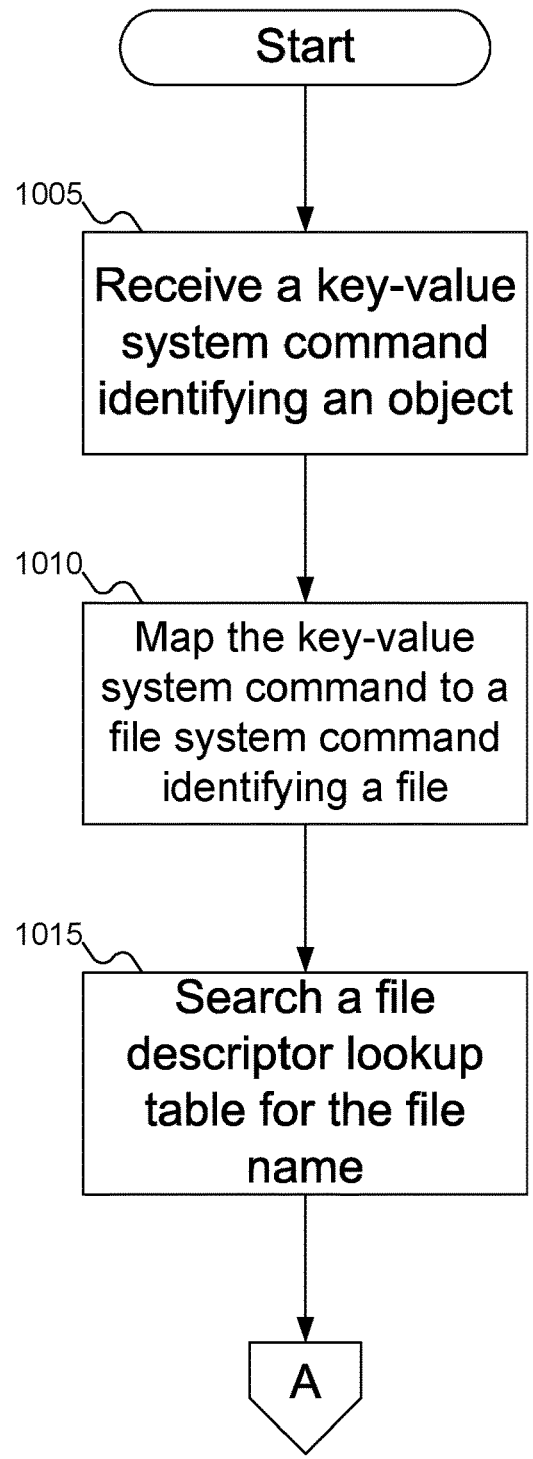
FIGS. 10A-10B show a flowchart of an example procedure for the operation of the KVFS shim of FIG. 1, according to an embodiment of the inventive concept.
Figure 10B:
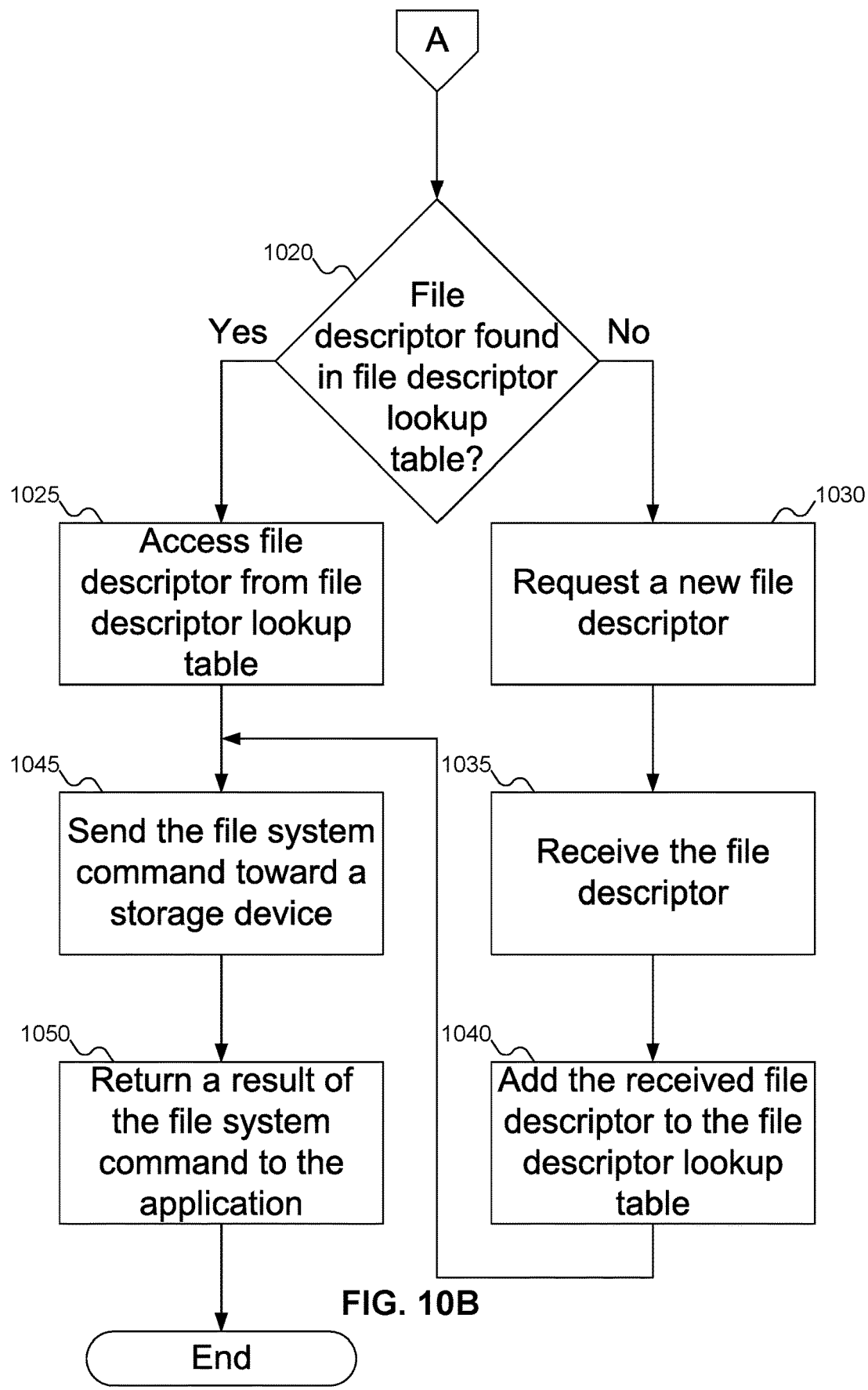

FIGS. 10A-10B show a flowchart of an example procedure for the operation of KVFS shim 140 of FIG. 1, according to an embodiment of the inventive concept. In FIG. 10A, at block 1005, reception unit 505 of FIG. 5 may receive key-value system command 305 of FIG. 3A from application 125 of FIG. 1. At block 1010, mapping unit 510 of FIG. 5 may map key-value system command 305 of FIG. 3A to file system command 310 of FIG. 3A. As described below with reference to FIG. 13, this may involve generating a name for metadata object 170 of FIG. 1. At block 1015, KVFS shim 140 of FIG. 1 may search file descriptor lookup table 525 to see if a file descriptor exists for file 175 of FIG. 1.

At block 1020 (FIG. 10B), KVFS shim 140 of FIG. 1 may determine if a file descriptor for file 175 of FIG. 1 was found in file descriptor lookup table 525 of FIG. 5. If a file descriptor for file 175 of FIG. 1 was found in file descriptor lookup table 525 of FIG. 5, then the file descriptor is accessed at block 1025. Otherwise, at block 1030, KVFS shim 140 of FIG. 1 requests a new file descriptor for file 175 of FIG. 1. This request may involve asking file system 135 of FIG. 1 to open file 175 of FIG. 1. At block 1035, KVFS shim 140 of FIG. 1 may receive the new file descriptor from file system 135 of FIG. 1, and at block 1040, KVFS shim 140 of FIG. 1 may add the new file descriptor (and the name for metadata object 170 of FIG. 1) to file descriptor lookup table 525 of FIG. 5.

Either way, once KVFS shim 140 of FIG. 1 has the file descriptor for file 175 of FIG. 1, at block 1045, KVFS shim 140 of FIG. 1 may send file system command 310 toward storage device 120 of FIG. 1 (via operating system 130 of FIG. 1). Then, at block 1050, KVFS shim 140 of FIG. 1 may return result 325 of FIG. 3A, as received from operating system 130 of FIG. 3A, to application 125 of FIG. 1

Note again that KVFS shim 140 of FIG. 1 is responsible for translating key-value system commands to file system commands, so that native page cache 315 of FIG. 3A of operating system 130 of FIG. 3A may be leveraged. If application 125 issues file system commands rather than key-value system commands, KVFS shim 140 of FIG. 1 may be bypassed and the file system command delivered directly to operating system 130 of FIG. 1 (and result 325 of FIG. 3B may be returned directly to application 125 of FIG. 1).

Figure 11A:
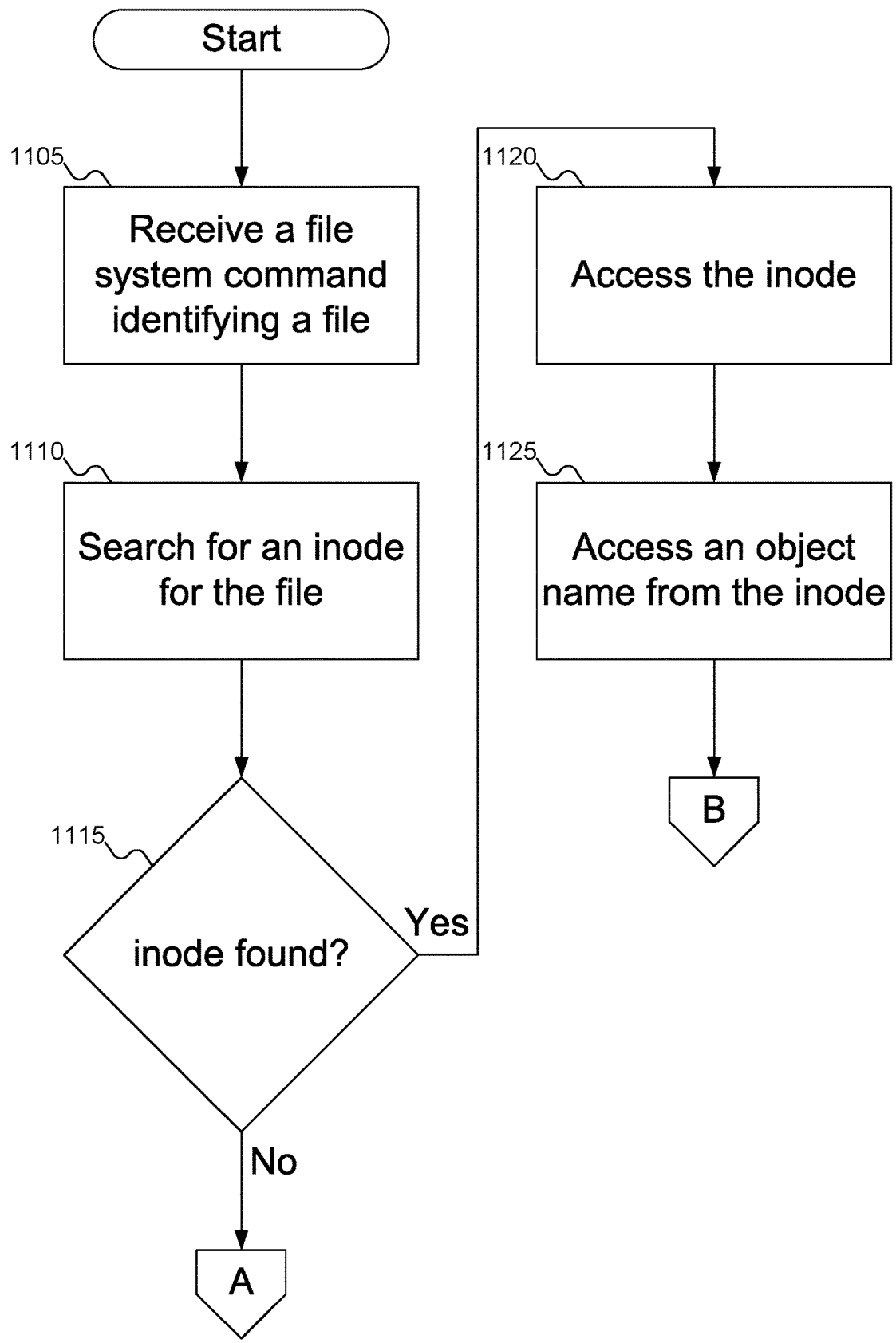
FIGS. 11A-11B show a flowchart of an example procedure for the operation of the KVFS of FIG. 1, according to an embodiment of the inventive concept.
Figure 11B:
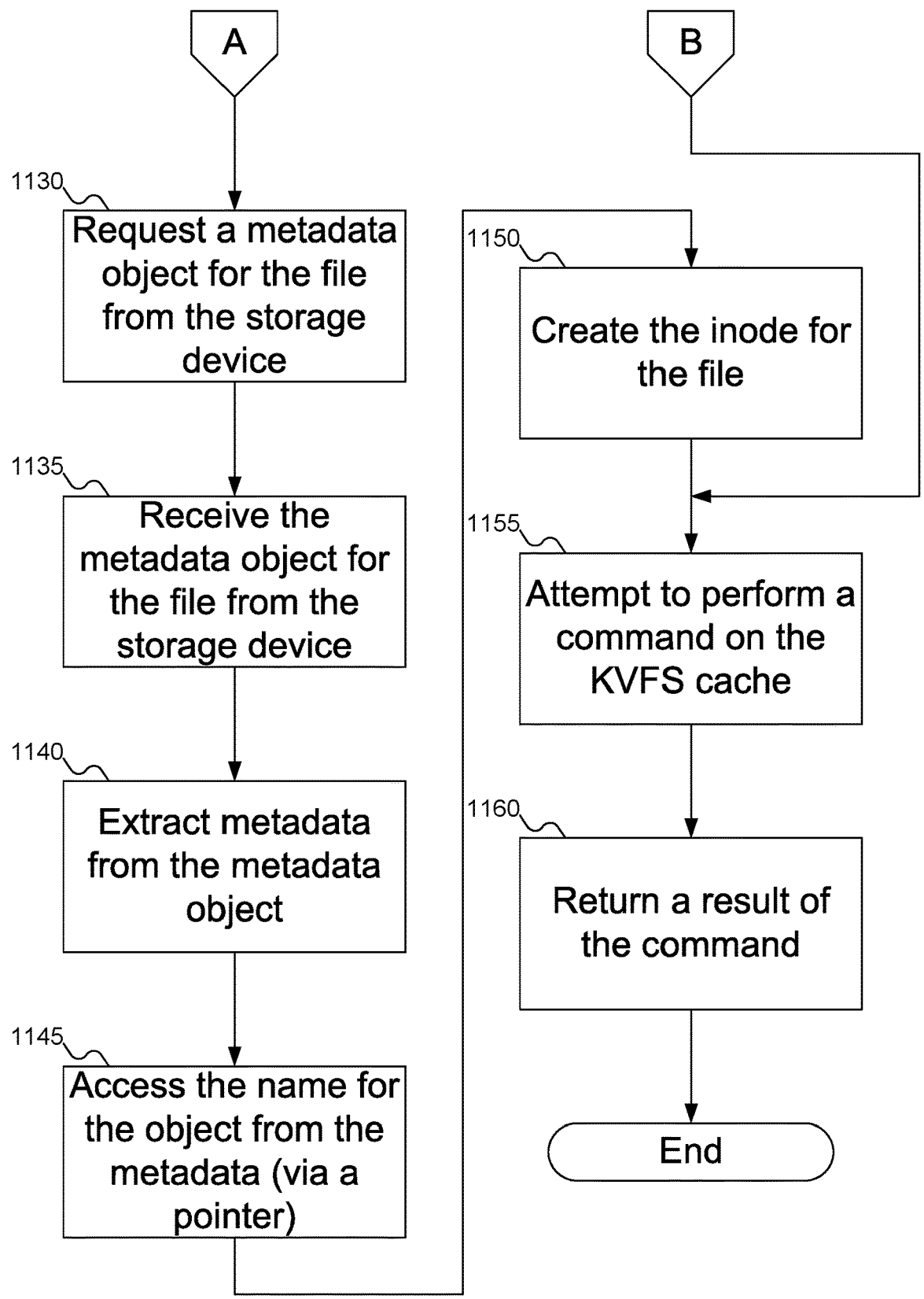

FIGS. 11A-11B show a flowchart of an example procedure for the operation of KVFS 145 of FIG. 1, according to an embodiment of the inventive concept. In FIG. 11A, at block 1105, KVFS 145 of FIG. 1 may receive file system command 310 of FIG. 3A. At block 1110, KVFS 145 of FIG. 1 may search for inode 425 of FIG. 4 that contains metadata for file 175 of FIG. 1 identified by file system command 310 of FIG. 3A. At block 1115, KVFS 145 of FIG. 1 may determine if inode 425 of FIG. 4 was located. If inode 425 of FIG. 4 was located, then at block 1120, KVFS 145 of FIG. 1 may access inode 425 of FIG. 4, and at block 1125, KVFS 145 of FIG. 1 may access object name 180 from inode 425 of FIG. 4.

On the other hand, if at block 1115 KVFS 145 of FIG. 1 could not locate inode 425 of FIG. 4, then at block 1130 (FIG. 11B), KVFS 145 of FIG. 1 may request metadata object 170 of FIG. 1 from storage device 120 of FIG. 1. At block 1135, KVFS 145 of FIG. 1 may receive metadata object 170 of FIG. 1 from storage device 120. At block 1140, KVFS 145 of FIG. 1 may extract metadata from metadata object 170 of FIG. 1. At block 1145, KVFS 145 of FIG. 1 may access object name 180 of FIG. 1 from metadata object 170 of FIG. 1. This extraction might be a direct operation, if metadata object 170 directly stores object name 180, or it might be an indirect operation: KVFS 145 of FIG. 1 might first extract a pointer to object name 180 (and possibly name length 845) before loading object name 180. And at block 1150, KVFS 145 of FIG. 1 may create inode 425 of FIG. 4.

Regardless of whether inode 425 of FIG. 4 was located or created, at block 1155 KVFS 145 of FIG. 1 may attempt to perform the file system command on copy 155 of FIG. 1 of data object 165 of FIG. 1, if present in KVFS cache 150 of FIG. 1. Finally, at block 1160, KVFS 145 of FIG. 1 may return a result of the command.

A review of FIGS. 11A-11B might suggest that KVFS 145 of FIG. 1 does not send a key-value system command to storage device 120 of FIG. 1. This conclusion would be incorrect, as explained below with reference to FIGS. 12A-12B, which elaborates on block 1155 of FIG. 11B.

Figure 12A:
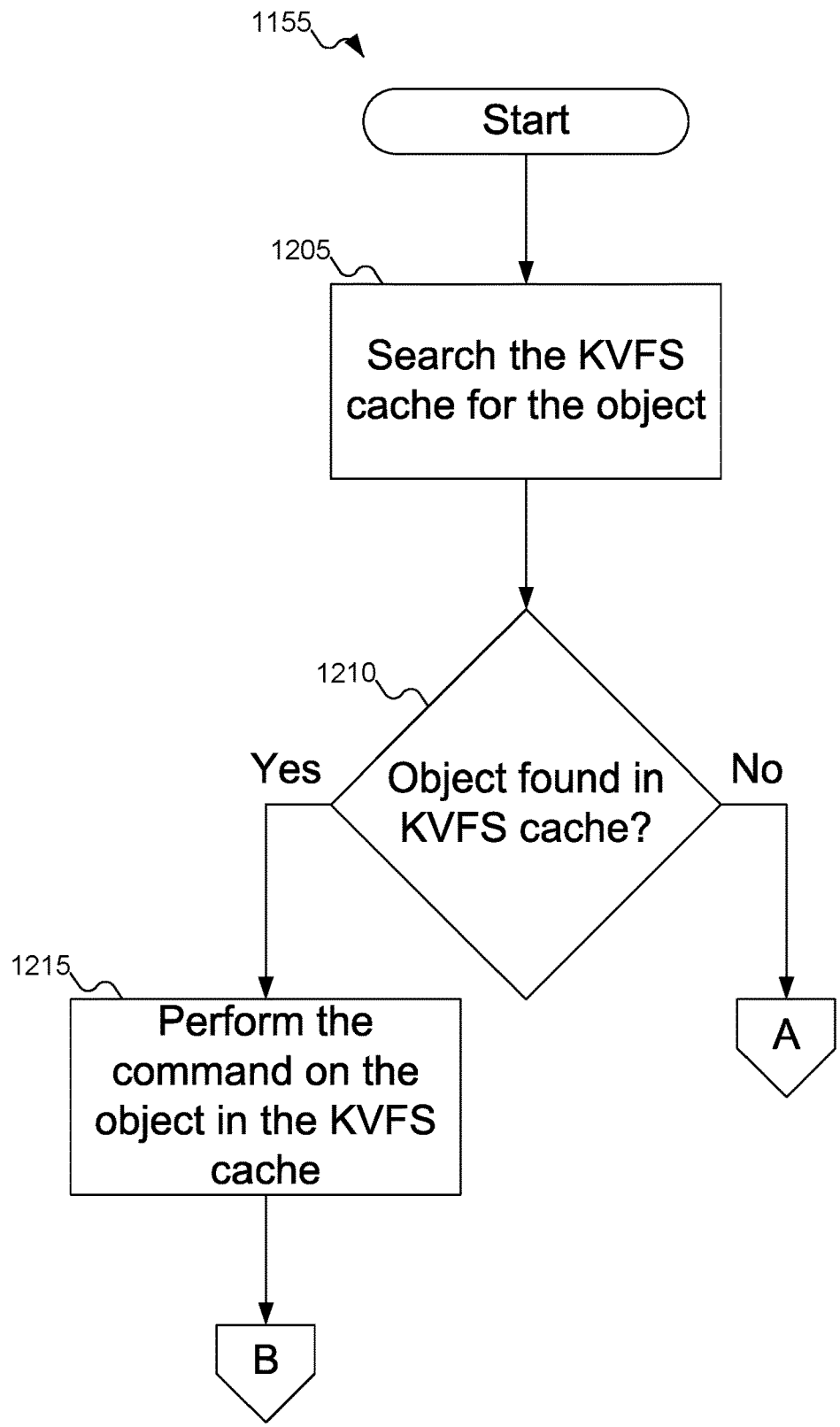
FIGS. 12A-12B show a flowchart of an example procedure for using the KVFS cache of FIG. 1, according to an embodiment of the inventive concept.
Figure 12B:
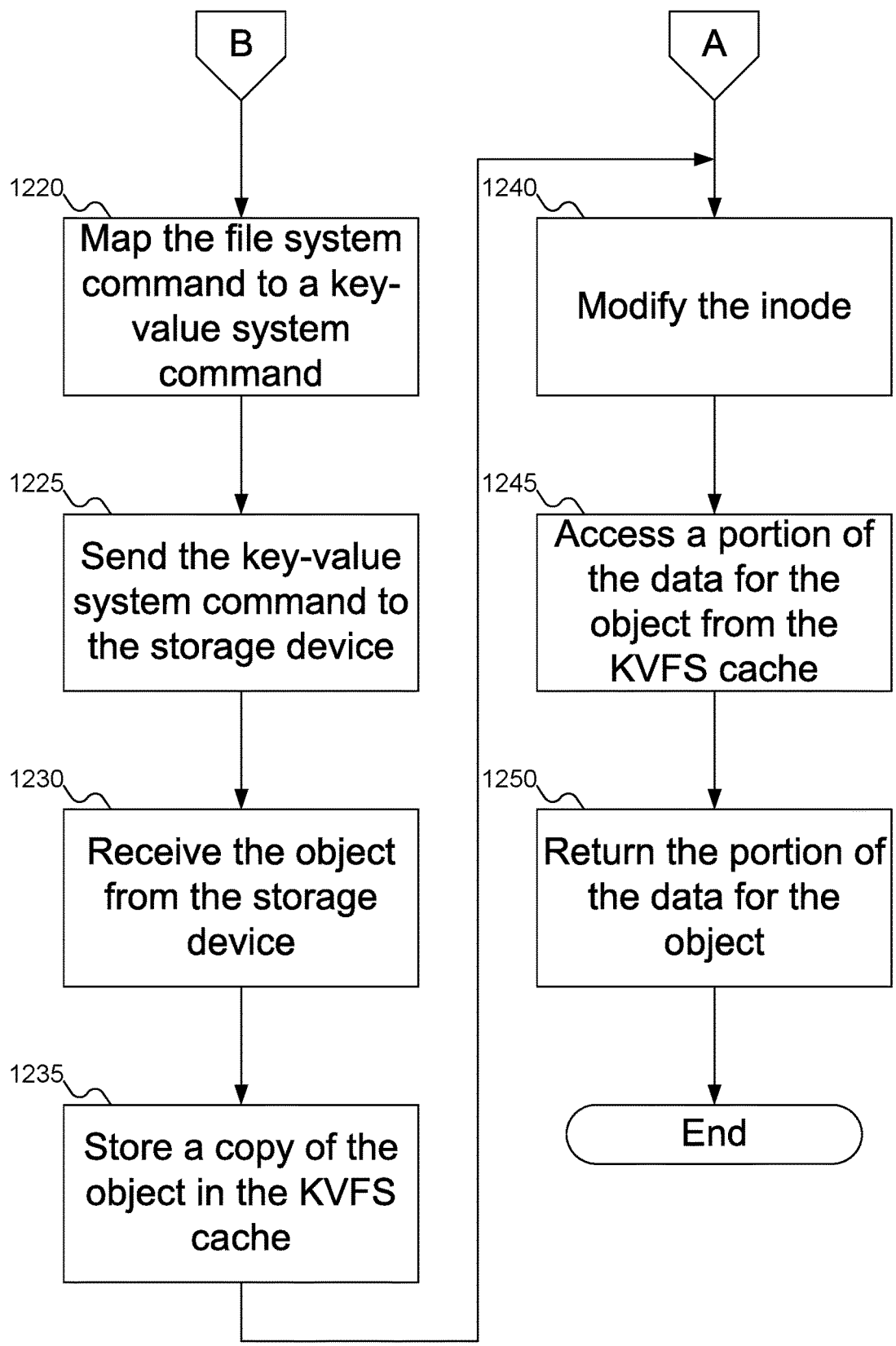

FIGS. 12A-12B show a flowchart of an example procedure for using KVFS cache 150 of FIG. 1, according to an embodiment of the inventive concept. In FIG. 12A, at block 1205, KVFS 145 of FIG. 1 may search KVFS cache 150 of FIG. 1 to see if copies 155 and 160 of FIG. 1 of data object 165 and metadata object 170 of FIG. 1 are in KVFS cache 150 of FIG. 1. At block 1210, KVFS 145 of FIG. 1 may determine if KVFS cache 150 of FIG. 1 stores copies 155 and 160 of FIG. 1 of data object 165 and metadata object 170 of FIG. 1. Note that in this context, "storing a copy" does not necessarily mean storing the entirety of copies 155 and 160 of FIG. 1 of data object 165 and metadata object 170 of FIG. 1, or even necessarily parts of both data object 165 and metadata object 170 of FIG. 1. All that is needed is for KVFS cache 150 of FIG. 1 to store copies of the portions of data object 165 and/or metadata object 170 of FIG. 1 to which the file system command applies. If KVFS cache 150 of FIG. 1 stores copies of all of the pertinent portions of data object 165 and/or metadata object 170 of FIG. 1, KVFS 145 of FIG. 1 may conclude that KVFS cache 150 of FIG. 1 stores copies 155 and 160 of FIG. 1 of data object 165 and metadata object 170 of FIG. 1, even if copies 155 and 160 of FIG. 1 are not complete copies of data object 165 and metadata object 170 of FIG. 1.

If KVFS cache 150 of FIG. 1 stores copies 155 and 160 of FIG. 1 of data object 165 and metadata object 170 of FIG. 1, then at block 1215, KVFS 145 of FIG. 1 may perform file system command 310 of FIG. 3A on copies 155 and 160 of FIG. 1. If file system command 310 involves changing any data for either data object 165 of FIG. 1 or metadata object 170 of FIG. 1, then KVFS 145 of FIG. 1 may either mark the affected pages in KVFS cache 150 of FIG. 1 as dirty, so the changed data may eventually be flushed to storage device 120, or KVFS 145 of FIG. 1 may immediately delete the existing affected objects and store replacement copies of the changed objects in storage device 120.

If KVFS cache 150 of FIG. 1 does not store copy 155 of FIG. 1 of data object 165 of FIG. 1, then at block 1220 (FIG. 12B), KVFS 145 of FIG. 1 may map file system command 310 of FIG. 3A to key-value system command 330 of FIG. 3A. At block 1225, KVFS 145 of FIG. 1 may send key-value system command 330 of FIG. 3A to storage device 120 of FIG. 1. At block 1230, KVFS 145 of FIG. 1 may receive a copy of the object that was affected by key-value system command 330 of FIG. 3A from storage device 120. At block 1235, KVFS 145 of FIG. 1 may store copies 155 and/or 160 of FIG. 1 of data object 165 and/or metadata object 170 of FIG. 1 in KVFS cache 150 of FIG. 1, as received from storage device 120 of FIG. 1.

At block 1240, whether or not KVFS cache 150 of FIG. 1 stored copies 155 and/or 160 of FIG. 1 or data object 165 and/or metadata object 170 of FIG. 1, the command has been performed. At block 1240, KVFS 145 of FIG. 1 may modify mode 425 of FIG. 4 to reflect whatever changes were indicated by file system command 330 of FIG. 3A. At block 1245, KVFS 145 of FIG. 1 may access the pertinent portion of the data from either or both of copies 155 and/or 160 of FIG. 1 from KVFS cache 150 of FIG. 1. At block 1250, KVFS 145 of FIG. 1 may return the access portion of data to operating system 130 of FIG. 1.

Figure 13:
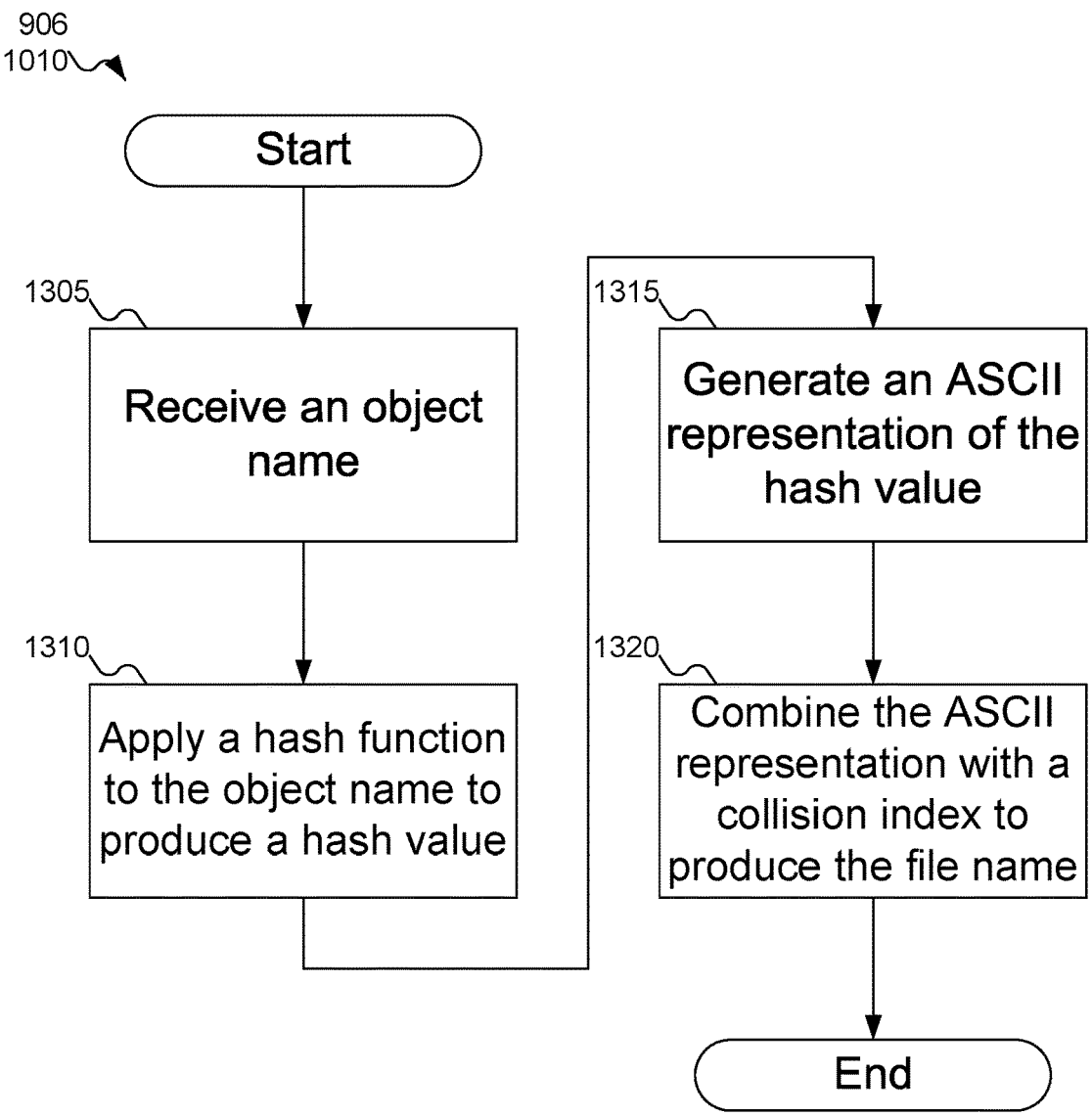
FIG. 13 shows a flowchart of an example procedure for generating a file name from an object name using the name generator unit of FIG. 5, according to an embodiment of the inventive concept.

FIG. 13 shows a flowchart of an example procedure for generating a file name from object name 180 using name generator unit 530 of FIG. 5, according to an embodiment of the inventive concept. In FIG. 13, at block 1305, KVFS shim 140 of FIG. 1 may receive object name 180, from which a file name is to be generated. At block 1310, hash unit 605 of FIG. 6 may apply a hash algorithm to object name 180 of FIG. 1 to produce a hash value. At block 1315, ASCII representation unit 610 of FIG. 6 may generate an ASCII representation of the hash value, thereby producing a valid file name within file system 135 of FIG. 1. At block 1320, collision index unit 615 may combine the ASCII representation of the hash value with a collision index to produce a name for metadata object 170 of FIG. 1 that is guaranteed to be unique within operating system 130 of FIG. 1 (or at least, unique within the folder that is supposed to contain file 175 of FIG. 1).

Figure 14:
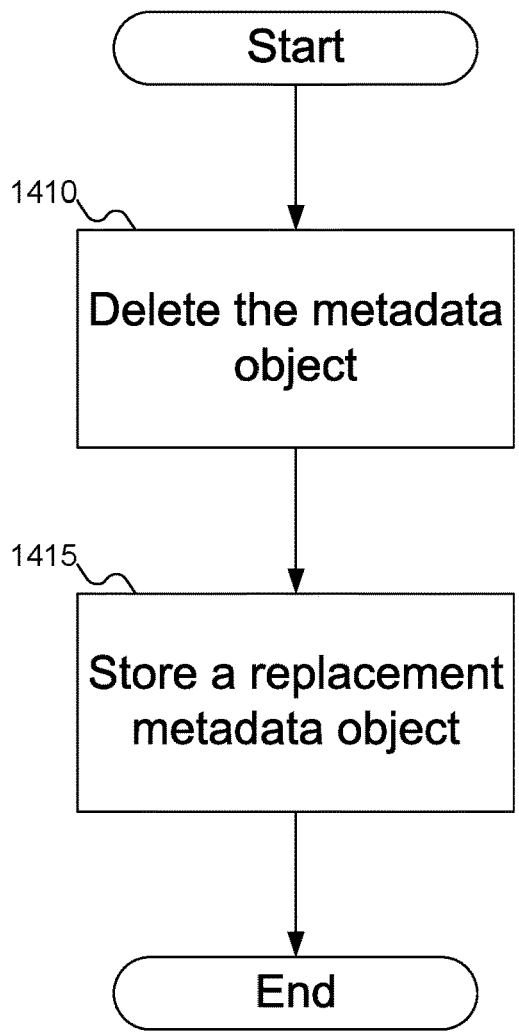
FIGS. 14 shows a flowchart of an example procedure for modifying the metadata object of FIG. 1 in the system of FIG. 1, according to an embodiment of the inventive concept.

FIGS. 14 shows a flowchart of an example procedure for modifying metadata object 170 of FIG. 1 in the system of FIG. 1, according to an embodiment of the inventive concept. Recall that when storage device 120 of FIG. 1 is a flash-based storage device, data may not be overwritten. Instead, to modify data the original data is invalidated (and later subject to garbage collection), and a new data object is written containing the modified data. In FIG. 14, at block 1410, KVFS 145 of FIG. 1 may delete metadata object 170 of FIG. 1 from storage device 120 of FIG. 1. At block 1415, KVFS 145 of FIG. 1 may store a replacement metadata object in storage device 120 of FIG. 1.

In FIGS. 9A-14, some embodiments of the inventive concept are shown. But a person skilled in the art will recognize that other embodiments of the inventive concept are also possible, by changing the order of the blocks, by omitting blocks, or by including links not shown in the drawings. All such variations of the flowcharts are considered to be embodiments of the inventive concept, whether expressly described or not.

The following discussion is intended to provide a brief, general description of a suitable machine or machines in which certain aspects of the inventive concept may be implemented. The machine or machines may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines may include embedded controllers, such as programmable or non-programmable logic devices or arrays, Application Specific Integrated Circuits (ASICs), embedded computers, smart cards, and the like. The machine or machines may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present inventive concept may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Embodiments of the inventive concept may include a tangible, non-transitory machine-readable medium comprising instructions executable by one or more processors, the instructions comprising instructions to perform the elements of the inventive concepts as described herein.

Having described and illustrated the principles of the inventive concept with reference to illustrated embodiments, it will be recognized that the illustrated embodiments may be modified in arrangement and detail without departing from such principles, and may be combined in any desired manner. And, although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms may reference the same or different embodiments that are combinable into other embodiments.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this inventive concept as defined in the claims.

Embodiments of the inventive concept may extend to the following statements, without limitation:

Statement 1. An embodiment of the inventive concept includes a system, comprising:
a computer (105);
a processor (110) in the computer (105);
a memory (115) in the computer (105);
a file system (135) stored in the memory (115) and running on the processor (110), the file system (135) including a page cache (315);
a key-value file system (KVFS) (145), the KVFS (145) including:
  a reception unit (405) to receive a file system command (310) from the file system (135), the file system command (310) including a file name (185) identifying a file (175);
  a mapping unit (410) to map the file system command (310) to a key-value system command (330);
  a command unit (415) to send the key-value system command (330) to a storage device (120); and
  a return unit (420) to return a result (325) of the key-value system command (330) to the file system (135).

Statement 2. An embodiment of the inventive concept includes a system according to statement 1, wherein the storage device (120) stores a data object (165) and a metadata object (170) for the file (175).

Statement 3. An embodiment of the inventive concept includes a system according to statement 1, further comprising an application (125) stored in the memory (115) and running on the processor (110) to issue the file system command (310).

Statement 4. An embodiment of the inventive concept includes a system according to statement 1, further comprising a KVFS shim (140), the KVFS shim (140) including:
a second reception unit (505) to receive a second key-value system command (305), the second key-value system command (305) including an object name (180);
a second mapping unit (510) to map the second key-value system command (305) to the file system command (310); and
a second command unit (515) to send the file system command (310) to the file system (135).

Statement 5. An embodiment of the inventive concept includes a system according to statement 4, wherein the KVFS shim (140) further includes a file descriptor locator table (525) to store a file descriptor (710, 720, 730) corresponding to the file (175).

Statement 6. An embodiment of the inventive concept includes a system according to statement 5, wherein the second command unit (515) is operative to send the file system command (310) and the file descriptor (710, 720, 730) to the file system (135).

Statement 7. An embodiment of the inventive concept includes a system according to statement 5, wherein the KVFS shim (140) further includes a name generator unit (530) to generate the file name (185) from the object name (180).

Statement 8. An embodiment of the inventive concept includes a system according to statement 7, wherein the name generator unit (530) includes a hash unit (605) to hash the object name (180) to produce a hash value.

Statement 9. An embodiment of the inventive concept includes a system according to statement 8, wherein the name generator unit (530) further includes an ASCII representation unit (610) to generate the file name (185) as an ASCII representation of the hash value.

Statement 10. An embodiment of the inventive concept includes a system according to statement 9, wherein the name generator further includes a collision index unit (615) to combine the file name (185) with a collision index.

Statement 11. An embodiment of the inventive concept includes a system according to statement 1, wherein the KVFS (145) includes a KVFS cache (150).

Statement 12. An embodiment of the inventive concept includes a system according to statement 11, wherein the KVFS cache (150) is operative to store a copy (155) of data for an object (165, 170) from the storage device (120).

Statement 13. An embodiment of the inventive concept includes a system according to statement 12, wherein the return unit (420) is operative to return only a portion of the data for the object (165, 170) stored in the KVFS cache (150) to the file system (135).

Statement 14. An embodiment of the inventive concept includes a system according to statement 1, wherein the KVFS (145) includes an inode (425), the inode (425) storing metadata for an object (165) from the storage device (120).

Statement 15. An embodiment of the inventive concept includes a memory (115), comprising:
a data structure stored in the memory (115), wherein the data structure includes:
a name (185) for a file (175);
a create date (805) for the file (175);
a modified date (810) for the file (175);
an access date (815) for the file (175);
a type (820) for the file (175);
a size (825) for the file (175);
a container (830) for the file (175);
an owner (835) for the file (175); and
a name (180) for an object (165) storing data.

Statement 16. An embodiment of the inventive concept includes a memory (115) according to statement 15, wherein the name (180) for an object (165) storing data includes a pointer (840) to the name (180) for the object (165) storing the data.

Statement 17. An embodiment of the inventive concept includes a memory (115) according to statement 16, wherein the name (180) for an object (165) storing data further includes a size (845) for the name (180) for the object (165) storing the data.

Statement 18. An embodiment of the inventive concept includes a memory (115) according to statement 15, wherein the data structure further includes a plurality of permissions (855) for the object (165) storing the data.

Statement 19. An embodiment of the inventive concept includes a memory (115) according to statement 18, wherein the plurality of permissions (855) for the object (165) storing the data includes a pointer (850) to a second data structure storing the plurality of permissions (855) for the object (165) storing the data.

Statement 20. An embodiment of the inventive concept includes a method, comprising:

receiving (927) a file system command (310), the file system command (310) including a file name (185) identifying a file (175);

mapping (945) the file system command (310) to at least one key-value system command (330) on at least one object name (180) identifying an object (165);

attempting (951) to use a key-value file system (KVFS) cache (150) to satisfy the at least one key-value system command (330);

receiving (972) a key-value system result (335) of the at least one key-value system command (330); and returning (975) the key-value system result (325).

Statement 21. An embodiment of the inventive concept includes a method according to statement 20, wherein receiving (927) a file system command (310) includes:

receiving (903) a second key-value system command (305), the second key-value system command (305) including a second object name (180) identifying a second object (165); and mapping (906) the second key-value system command (305) to the file system command (310).

Statement 22. An embodiment of the inventive concept includes a method according to statement 21, wherein receiving (903) a second key-value system command (305) includes receiving (903) the second key-value system command (305), the second key-value system command (305) drawn from a set including a PUT command, a GET command, and a DELETE command.

Statement 23. An embodiment of the inventive concept includes a method according to statement 21, wherein mapping (906) the second key-value system command (305) to the file system command (310) includes generating (1310, 1315, 1320) the file name (185) from the second object name (180).

Statement 24. An embodiment of the inventive concept includes a method according to statement 23, wherein generating (1310, 1315, 1320) the file name (185) from the second object name (180) includes applying (1310) a hash function to the second object name (180) to produce the file name (185).

Statement 25. An embodiment of the inventive concept includes a method according to statement 24, wherein applying (1310) a hash function to the second object name (180) to produce the file name (185) includes:

applying (1310) the hash function to the second object name (180) to produce a hash value; and generating (1315) the file name (185) as an ASCII representation of the hash value.

Statement 26. An embodiment of the inventive concept includes a method according to statement 25, wherein generating (1315) the file name (185) from the second object name (180) further includes combining (1320) the ASCII representation of the hash value with a collision index.

Statement 27. An embodiment of the inventive concept includes a method according to statement 21, wherein receiving (927) a file system command (310) includes further includes searching (909) a file descriptor lookup table (525) for a file descriptor (710, 720, 730) associated with the file name (185).

Statement 28. An embodiment of the inventive concept includes a method according to statement 27, wherein receiving (927) a file system command (310) further includes, if the file descriptor lookup table (525) does not include the file name (185):

receiving (921) the file descriptor (710, 720, 730) for the file (175);

adding (924) the file descriptor (710, 720, 730) and the file name (185) to the file descriptor lookup table (525).

Statement 29. An embodiment of the inventive concept includes a method according to statement 27, wherein receiving (927) a file system command (310) further includes, if the file descriptor lookup table (525) includes the file name (185), accessing (915) the file descriptor (710, 720, 730) for the file (175) from the file descriptor lookup table (525) using the file name (185).

Statement 30. An embodiment of the inventive concept includes a method according to statement 23, wherein receiving (927) a file system command (310) further includes:

requesting (933) a metadata object (170) from a storage device (120), the metadata object (170) identified by the file name (185); and receiving (936) the metadata object (170) from the storage device (120), the metadata object (170) including metadata for the file (175).

Statement 31. An embodiment of the inventive concept includes a method according to statement 30, wherein:

mapping (945) the file system command (310) to at least one key-value system command (330) includes accessing (942) the second object name (180) from the metadata object (170); and attempting (951) to use a key-value file system (KVFS) cache (150) to satisfy the at least one key-value system command (330) includes:

attempting (951) to use the key-value file system (KVFS) cache (150) to satisfy the at least one key-value system command (330) using the metadata object (170); and attempting (951) to use the key-value file system (KVFS) cache (150) to satisfy a second key-value system command (330) using the second object (165).

Statement 32. An embodiment of the inventive concept includes a method according to statement 31, wherein accessing (942) the second object name (180) from the metadata object (170) includes:

accessing (942) a pointer (840) to the second object name (180) for the second object (165) from the metadata object (170); and retrieving (942) the second object name (180) using the pointer (840) to the second object name (180).

Statement 33. An embodiment of the inventive concept includes a method according to statement 32, wherein:

accessing (942) a pointer (840) to the second object name (180) for the second object (165) from the metadata object (170) includes accessing (942) the pointer (840) to the second object name (180) and a name length (845) for the second object name (180) from the metadata object (170); and retrieving (942) the second object name (180) using the pointer (840) to the second object name (180) includes retrieving (942) the second object name (180) using the pointer (840) to the second object name (180) and the name length (845) for the second object name (180).

Statement 34. An embodiment of the inventive concept includes a method according to statement 30, wherein receiving (927) a file system command (310) further includes storing (939) metadata from the metadata object (170) in an inode (425).

Statement 35. An embodiment of the inventive concept includes a method according to statement 34, wherein attempting (951) to use a key-value file system (KVFS) cache (150) to satisfy the at least one key-value system command (330) includes modifying (948) the inode (425) responsive to the at least one key-value system command (330).

Statement 36. An embodiment of the inventive concept includes a method according to statement 35, wherein modifying (948) the inode (425) responsive to the at least one key-value system command (330) includes:

deleting (1410) the metadata object (170) from the storage device (120); and storing (1415) a replacement metadata object (170) on the storage device (120).

Statement 37. An embodiment of the inventive concept includes a method according to statement 20, wherein attempting (951) to use a key-value file system (KVFS) cache (150) to satisfy the at least one key-value system command (330) includes searching (954) a key-value file system (KVFS) cache (150) for the object (165).

Statement 38. An embodiment of the inventive concept includes a method according to statement 37, wherein receiving (972) a key-value system result (335) of the at least one key-value system command (330) includes, if the KVFS cache (150) stores the object (165), accessing (969) data for the object (165) from the KVFS cache (150).

Statement 39. An embodiment of the inventive concept includes a method according to statement 38, wherein receiving (972) a key-value system result (335) of the at least one key-value system command (330) further includes, if the KVFS cache (150) does not store the object (165):

sending (960) the key-value system command (330) to the storage device (120);

receiving (963) data for the object (165) from the storage device (120); and storing (966) the data in the KVFS cache (150).

Statement 40. An embodiment of the inventive concept includes a method according to statement 37, wherein receiving (972) a key-value system result (335) of the at least one key-value system command (330) includes:

accessing (969) only a portion of a data for the object (165); and returning (972) the portion of the data as the key-value system result (325).

Statement 41. An embodiment of the inventive concept includes a method, comprising:

receiving (1005) a key-value system command (330), the key-value system command (330) including an object name (180) identifying an object (165);

mapping (1010) the key-value system command (330) to a file system command (310); and sending (1045) the file system command (310) toward a storage device (120).

Statement 42. An embodiment of the inventive concept includes a method according to statement 41, wherein receiving (1005) a key-value system command (330) includes receiving (1005) the key-value system command (330), the key-value system command (330) drawn from a set including a PUT command, a GET command, and a DELETE command.

Statement 43. An embodiment of the inventive concept includes a method according to statement 41, wherein mapping (1010) the key-value system command (330) to the file system command (310) includes generating (1310, 1315, 1320) a file name (185) from the object name (180).

Statement 44. An embodiment of the inventive concept includes a method according to statement 43, wherein generating (1310, 1315, 1320) the file name (185) from the object name (180) includes applying (1310) a hash function to the object name (180) to produce the file name (185).

Statement 45. An embodiment of the inventive concept includes a method according to statement 44, wherein applying (1310) a hash function to the object name (180) to produce the file name (185) includes:

applying (1310) the hash function to the object name (180) to produce a hash value; and generating (1315) the file name (185) as an ASCII representation of the hash value.

Statement 46. An embodiment of the inventive concept includes a method according to statement 45, wherein generating (1315) the file name (185) from the object name (180) further includes combining (1320) the ASCII representation of the hash value with a collision index.

Statement 47. An embodiment of the inventive concept includes a method according to statement 41, wherein mapping (1010) the key-value system command (330) to a file system command (310) includes searching (1015) a file descriptor lookup table (525) for a file descriptor (710, 720, 730) associated with the file name (185).

Statement 48. An embodiment of the inventive concept includes a method according to statement 47, wherein mapping (1010) the key-value system command (330) to a file system command (310) further includes, if the file descriptor lookup table (525) does not include the file name (185):

receiving (1035) the file descriptor (710, 720, 730) for a file (175) corresponding to the object (165);

adding (1040) the file descriptor (710, 720, 730) and the file name (185) to the file descriptor lookup table (525).

Statement 49. An embodiment of the inventive concept includes a method according to statement 47, wherein mapping (1010) the key-value system command (330) to a file system command (310) further includes, if the file descriptor lookup table (525) includes the file name (185), accessing (1025) the file descriptor (710, 720, 730) for the file (175) from the file descriptor lookup table (525) using the file name (185).

Statement 50. An embodiment of the inventive concept includes a method according to statement 41, further comprising returning (1050) a result (320) of the file system command (310).

Statement 51. An embodiment of the inventive concept includes a method, comprising:

receiving (1105) a file system command (310), the file system command (310) identifying a file (175);

accessing (1120) an inode (425) corresponding to the file (175);

accessing (1125) an object name (180) from the inode (425), the object name (180) identifying an object (165) stored in a storage device (120);

attempting (1155) to perform a command on the object (165) in a key-value file system (KVFS) cache (150); and returning (1160) a result (325) of the command.

Statement 52. An embodiment of the inventive concept includes a method according to statement 51, wherein:

receiving (1105) a file system command (310) includes receiving (1105) the file system command (310), the file system command (310) including a file descriptor (710, 720, 730); and accessing (1120) an inode (425) corresponding to the file (175) includes accessing (1120) the inode (425) corresponding to the file descriptor (710, 720, 730).

Statement 53. An embodiment of the inventive concept includes a method according to statement 51, wherein attempting (1155) to perform a command on an object (165) in a key-value file system (KVFS) cache (150) includes:

searching (1205) the KVFS cache (150) for the object name (180); and if an object (165) with the object name (180) exists in the KVFS cache (150), performing (1215) a command on the object (165) in the KVFS cache (150).

Statement 54. An embodiment of the inventive concept includes a method according to statement 53, wherein attempting (1155) to perform a command on an object (165) in a key-value file system (KVFS) cache (150) further comprises, if the object (165) with the object name (180) does not exist in the KVFS cache (150):

mapping (1220) the file system command (310) to a key-value system command (330);

sending (1225) the key-value system command (330) on the object (165) with the object name (180) to the storage device (120);

receiving (1230) the object (165) from the storage device (120); and storing (1235) the object (165) in the KVFS cache (150).

Statement 55. An embodiment of the inventive concept includes a method according to statement 54, wherein returning (1160) a result (320) of the key-value system command (330) includes:

accessing (1245) only a portion of a data for the object (165); and returning (1250) the portion of the data as the key-value system result (325).

Statement 56. An embodiment of the inventive concept includes a method according to statement 51, further comprising, if no inode (425) corresponding to the file descriptor (710, 720, 730) may be located:

requesting (1130) a metadata object (170) from the storage device (120), the metadata object (170) identified by the file name (185);

receiving (1135) the metadata object (170) from the storage device (120), the metadata object (170) including metadata for the file (175).

extracting (1140) the metadata from the metadata object (170); and creating (1150) the inode (425) using the metadata.

Statement 57. An embodiment of the inventive concept includes a method according to statement 56, wherein extracting (1140) the metadata from the metadata object (170) includes accessing (1145) a pointer to the object name (180) from the metadata object (170).

Statement 58. An embodiment of the inventive concept includes a method according to statement 57, wherein accessing (1145) a pointer to the object name (180) for the object (165) from the metadata object (170) includes accessing (1145) the pointer to the object name (180) and a name length (845) for the object name (180) from the metadata object (170).

Statement 59. An embodiment of the inventive concept includes a method according to statement 51, wherein attempting (1155) to perform a command on an object (165) in a key-value file system (KVFS) cache (150) includes modifying the inode (425) responsive to the file system command (310).

Statement 60. An embodiment of the inventive concept includes a method according to statement 59, wherein attempting (1155) to perform a command on an object (165) in a key-value file system (KVFS) cache (150) further includes:

deleting (1410) the metadata object (170) from the storage device (120); and storing (1415) a replacement metadata object (170) on the storage device (120).

Statement 61. An embodiment of the inventive concept includes a method, comprising:

receiving (1305) an object name (180), the object name (180) identifying an object (170) stored on a storage device (120); and applying (1310) a hash function to the object name (180) to produce the file name (185).

Statement 62. An embodiment of the inventive concept includes a method according to statement 61, further comprising generating (1315) the file name (185) as an ASCII representation of the hash value.

Statement 63. An embodiment of the inventive concept includes a method according to statement 62, wherein generating (1315) the file name (185) as an ASCII representation of the hash value includes combining (1320) the ASCII representation of the hash value with a collision index.

Statement 64. An embodiment of the inventive concept includes an article, comprising a tangible storage medium, said tangible storage medium having stored thereon non-transitory instructions that, when executed by a machine (105), result in:

receiving (927) a file system command (310), the file system command (310) including a file name (185) identifying a file (175);

mapping (945) the file system command (310) to at least one key-value system command (330) on at least one object name (180) identifying an object (165);

attempting (951) to use a key-value file system (KVFS) cache (150) to satisfy the at least one key-value system command (330);

receiving (972) a key-value system result (335) of the at least one key-value system command (330); and returning (975) the key-value system result (325).

Statement 65. An embodiment of the inventive concept includes an article according to statement 64, wherein receiving (927) a file system command (310) includes:

receiving (903) a second key-value system command (305), the second key-value system command (305) including a second object name (180) identifying a second object (165); and mapping (906) the second key-value system command (305) to the file system command (310).

Statement 66. An embodiment of the inventive concept includes an article according to statement 65, wherein receiving (903) a second key-value system command (305) includes receiving (903) the second key-value system command (305), the second key-value system command (305) drawn from a set including a PUT command, a GET command, and a DELETE command.

Statement 67. An embodiment of the inventive concept includes an article according to statement 65, wherein mapping (906) the second key-value system command (305) to the file system command (310) includes generating (1310, 1315, 1320) the file name (185) from the second object name (180).

Statement 68. An embodiment of the inventive concept includes an article according to statement 67, wherein generating (1310, 1315, 1320) the file name (185) from the second object name (180) includes applying (1310) a hash function to the second object name (180) to produce the file name (185).

Statement 69. An embodiment of the inventive concept includes an article according to statement 68, wherein applying (1310) a hash function to the second object name (180) to produce the file name (185) includes:

applying (1310) the hash function to the second object name (180) to produce a hash value; and generating (1315) the file name (185) as an ASCII representation of the hash value.

Statement 70. An embodiment of the inventive concept includes an article according to statement 69, wherein generating (1315) the file name (185) from the second object name (180) further includes combining (1320) the ASCII representation of the hash value with a collision index.

Statement 71. An embodiment of the inventive concept includes an article according to statement 65, wherein receiving (927) a file system command (310) includes further includes searching (909) a file descriptor lookup table (525) for a file descriptor (710, 720, 730) associated with the file name (185).

Statement 72. An embodiment of the inventive concept includes an article according to statement 71, wherein receiving (927) a file system command (310) further includes, if the file descriptor lookup table (525) does not include the file name (185):

receiving (921) the file descriptor (710, 720, 730) for the file (175);

adding (924) the file descriptor (710, 720, 730) and the file name (185) to the file descriptor lookup table (525).

Statement 73. An embodiment of the inventive concept includes an article according to statement 71, wherein receiving (927) a file system command (310) further includes, if the file descriptor lookup table (525) includes the file name (185), accessing (915) the file descriptor (710, 720, 730) for the file (175) from the file descriptor lookup table (525) using the file name (185).

Statement 74. An embodiment of the inventive concept includes an article according to statement 67, wherein receiving (927) a file system command (310) further includes:

requesting (933) a metadata object (170) from a storage device (120), the metadata object (170) identified by the file name (185); and receiving (936) the metadata object (170) from the storage device (120), the metadata object (170) including metadata for the file (175).

Statement 75. An embodiment of the inventive concept includes an article according to statement 74, wherein:

mapping (945) the file system command (310) to at least one key-value system command (330) includes accessing (942) the second object name (180) from the metadata object (170); and attempting (951) to use a key-value file system (KVFS) cache (150) to satisfy the at least one key-value system command (330) includes:

attempting (951) to use the key-value file system (KVFS) cache (150) to satisfy the at least one key-value system command (330) using the metadata object (170); and attempting (951) to use the key-value file system (KVFS) cache (150) to satisfy a second key-value system command (330) using the second object (165).

Statement 76. An embodiment of the inventive concept includes an article according to statement 75, wherein accessing (942) the second object name (180) from the metadata object (170) includes:

accessing (942) a pointer (840) to the second object name (180) for the second object (165) from the metadata object (170); and retrieving (942) the second object name (180) using the pointer (840) to the second object name (180).

Statement 77. An embodiment of the inventive concept includes an article according to statement 76, wherein:

accessing (942) a pointer (840) to the second object name (180) for the second object (165) from the metadata object (170) includes accessing (942) the pointer (840) to the second object name (180) and a name length (845) for the second object name (180) from the metadata object (170); and retrieving (942) the second object name (180) using the pointer (840) to the second object name (180) includes retrieving (942) the second object name (180) using the pointer (840) to the second object name (180) and the name length (845) for the second object name (180).

Statement 78. An embodiment of the inventive concept includes an article according to statement 74, wherein receiving (927) a file system command (310) further includes storing (939) metadata from the metadata object (170) in an inode (425).

Statement 79. An embodiment of the inventive concept includes an article according to statement 78, wherein attempting (951) to use a key-value file system (KVFS) cache (150) to satisfy the at least one key-value system command (330) includes modifying (948) the inode (425) responsive to the at least one key-value system command (330).

Statement 80. An embodiment of the inventive concept includes an article according to statement 79, wherein modifying (948) the inode (425) responsive to the at least one key-value system command (330) includes:

deleting (1410) the metadata object (170) from the storage device (120); and storing (1415) a replacement metadata object (170) on the storage device (120).

Statement 81. An embodiment of the inventive concept includes an article according to statement 64, wherein attempting (951) to use a key-value file system (KVFS) cache (150) to satisfy the at least one key-value system command (330) includes searching (954) a key-value file system (KVFS) cache (150) for the object (165).

Statement 82. An embodiment of the inventive concept includes an article according to statement 81, wherein receiving (972) a key-value system result (335) of the at least one key-value system command (330) includes, if the KVFS cache (150) stores the object (165), accessing (969) data for the object (165) from the KVFS cache (150).

Statement 83. An embodiment of the inventive concept includes an article according to statement 82, wherein receiving (972) a key-value system result (335) of the at least one key-value system command (330) further includes, if the KVFS cache (150) does not store the object (165):

sending (960) the key-value system command (330) to the storage device (120);

receiving (963) data for the object (165) from the storage device (120); and storing (966) the data in the KVFS cache (150).

Statement 84. An embodiment of the inventive concept includes an article according to statement 81, wherein receiving (972) a key-value system result (335) of the at least one key-value system command (330) includes:

accessing (969) only a portion of a data for the object (165); and returning (972) the portion of the data as the key-value system result (325).

Statement 85. An embodiment of the inventive concept includes an article, comprising a tangible storage medium, said tangible storage medium having stored thereon non-transitory instructions that, when executed by a machine (105), result in:

receiving (1005) a key-value system command (330), the key-value system command (330) including an object name (180) identifying an object (165);

mapping (1010) the key-value system command (330) to a file system command (310); and sending (1045) the file system command (310) toward a storage device (120).

Statement 86. An embodiment of the inventive concept includes an article according to statement 85, wherein receiving (1005) a key-value system command (330) includes receiving (1005) the key-value system command (330), the key-value system command (330) drawn from a set including a PUT command, a GET command, and a DELETE command.

Statement 87. An embodiment of the inventive concept includes an article according to statement 85, wherein mapping (1010) the key-value system command (330) to the file system command (310) includes generating (1310, 1315, 1320) a file name (185) from the object name (180).

Statement 88. An embodiment of the inventive concept includes an article according to statement 87, wherein generating (1310, 1315, 1320) the file name (185) from the object name (180) includes applying (1310) a hash function to the object name (180) to produce the file name (185).

Statement 89. An embodiment of the inventive concept includes an article according to statement 88, wherein applying (1310) a hash function to the object name (180) to produce the file name (185) includes:

applying (1310) the hash function to the object name (180) to produce a hash value; and generating (1315) the file name (185) as an ASCII representation of the hash value.

Statement 90. An embodiment of the inventive concept includes an article according to statement 89, wherein generating (1315) the file name (185) from the object name (180) further includes combining (1320) the ASCII representation of the hash value with a collision index.

Statement 91. An embodiment of the inventive concept includes an article according to statement 85, wherein mapping (1010) the key-value system command (330) to a file system command (310) includes searching (1015) a file descriptor lookup table (525) for a file descriptor (710, 720, 730) associated with the file name (185).

Statement 92. An embodiment of the inventive concept includes an article according to statement 91, wherein mapping (1010) the key-value system command (330) to a file system command (310) further includes, if the file descriptor lookup table (525) does not include the file name (185):

receiving (1035) the file descriptor (710, 720, 730) for a file (175) corresponding to the object (165);

adding (1040) the file descriptor (710, 720, 730) and the file name (185) to the file descriptor lookup table (525).

Statement 93. An embodiment of the inventive concept includes an article according to statement 91, wherein mapping (1010) the key-value system command (330) to a file system command (310) further includes, if the file descriptor lookup table (525) includes the file name (185), accessing (1025) the file descriptor (710, 720, 730) for the file (175) from the file descriptor lookup table (525) using the file name (185).

Statement 94. An embodiment of the inventive concept includes an article according to statement 85, said tangible storage medium having stored thereon non-transitory instructions that, when executed by t machine (105), result in:

returning (1050) fa result (320) of the file system command (310).

Statement 95. An embodiment of the inventive concept includes an article, comprising a tangible storage medium, said tangible storage medium having stored thereon non-transitory instructions that, when executed by a machine (105), result in:

receiving (1105) a file system command (310), the file system command (310) identifying a file (175);

accessing (1120) an inode (425) corresponding to the file (175);

accessing (1125) an object name (180) from the inode (425), the object name (180) identifying an object (165) stored in a storage device (120);

attempting (1155) to perform a command on the object (165) in a key-value file system (KVFS) cache (150); and returning (1160) a result (325) of the command.

Statement 96. An embodiment of the inventive concept includes an article according to statement 95, wherein:

receiving (1105) a file system command (310) includes receiving (1105) the file system command (310), the file system command (310) including a file descriptor (710, 720, 730); and accessing (1120) an inode (425) corresponding to the file (175) includes accessing (1120) the inode (425) corresponding to the file descriptor (710, 720, 730);

Statement 97. An embodiment of the inventive concept includes an article according to statement 95, wherein attempting (1155) to perform a command on an object (165) in a key-value file system (KVFS) cache (150) includes:

searching (1205) the KVFS cache (150) for the object name (180); and if an object (165) with the object name (180) exists in the KVFS cache (150), performing (1215) a command on the object (165) in the KVFS cache (150).

Statement 98. An embodiment of the inventive concept includes an article according to statement 97, wherein attempting (1155) to perform a command on an object (165) in a key-value file system (KVFS) cache (150) further includes, if the object (165) with the object name (180) does not exist in the KVFS cache (150):

mapping (1220) the file system command (310) to a key-value system command (330);

sending (1225) the key-value system command (330) on the object (165) with the object name (180) to the storage device (120);

receiving (1230) the object (165) from the storage device (120); and storing (1235) the object (165) in the KVFS cache (150).

Statement 99. An embodiment of the inventive concept includes an article according to statement 98, wherein returning (1160) a result (320) of the key-value system command (330) includes:

accessing (1245) only a portion of a data for the object (165); and returning (1250) the portion of the data as the key-value system result (325).

Statement 100. An embodiment of the inventive concept includes an article according to statement 95, said tangible storage medium having stored thereon further non-transitory instructions that, when executed by the machine (105), result in, if no inode (425) corresponding to the file descriptor (710, 720, 730) may be located:

requesting (1130) a metadata object (170) from the storage device (120), the metadata object (170) identified by the file name (185);

receiving (1135) the metadata object (170) from the storage device (120), the metadata object (170) including metadata for the file (175).

extracting (1140) the metadata from the metadata object (170); and creating (1150) the inode (425) using the metadata.

Statement 101. An embodiment of the inventive concept includes an article according to statement 100, wherein extracting (1140) the metadata from the metadata object (170) includes accessing (1145) a pointer to the object name (180) from the metadata object (170).

Statement 102. An embodiment of the inventive concept includes an article according to statement 101, wherein accessing (1145) a pointer to the object name (180) for the object (165) from the metadata object (170) includes accessing (1145) the pointer to the object name (180) and a name length (845) for the object name (180) from the metadata object (170).

Statement 103. An embodiment of the inventive concept includes an article according to statement 95, wherein attempting (1155) to perform a command on an object (165) in a key-value file system (KVFS) cache (150) includes modifying the inode (425) responsive to the file system command (310).

Statement 104. An embodiment of the inventive concept includes an article according to statement 103, wherein attempting (1155) to perform a command on an object (165) in a key-value file system (KVFS) cache (150) further includes:

deleting (1410) the metadata object (170) from the storage device (120); and storing (1415) a replacement metadata object (170) on the storage device (120).

Statement 105. An embodiment of the inventive concept includes an article, comprising a tangible storage medium, said tangible storage medium having stored thereon non-transitory instructions that, when executed by a machine (105), result in:

receiving (1305) an object name (180), the object name (180) identifying an object (170) stored on a storage device (120); and applying (1310) a hash function to the object name (180) to produce the file name (185).

Statement 106. An embodiment of the inventive concept includes a method according to statement 105, said tangible storage medium having stored thereon further non-transitory instructions that, when executed by the machine (105), result in generating (1315) the file name (185) as an ASCII representation of the hash value.

Statement 107. An embodiment of the inventive concept includes a method according to statement 106, wherein generating (1315) the file name (185) as an ASCII representation of the hash value includes combining (1320) the ASCII representation of the hash value with a collision index.

Consequently, in view of the wide variety of permutations to the embodiments described herein, this detailed description and accompanying material is intended to be illustrative only, and should not be taken as limiting the scope of the inventive concept. What is claimed as the inventive concept, therefore, is all such modifications as may come within the scope and spirit of the following claims and equivalents thereto.

What is claimed is:

1. A system, comprising:
   a computer;
   a processor in the computer;
   a memory in the computer;
   a key-value file system (KVFS) shim stored in the memory and running on the processor, the KVFS shim including:
      a first reception unit to receive a first key-value system command, the first key-value system command including an object name;
      a first mapping unit to map the first key-value system command to a file system command; and
      a first command unit to send the file system command to a file system;
   the file system stored in the memory and running on the processor, the file system including a page cache;
   a KVFS stored in the memory and running on the processor, the KVFS including:
      a second reception unit to receive the file system command from the file system, the file system command including a file name identifying a file;
      a second mapping unit to map the file system command to a second key-value system command;
      a second command unit to send the second key-value system command to a key-value storage device; and
      a return unit to return a result of the second key-value system command to the file system,
   wherein an object is stored on the key-value storage device and data for the object is stored in the page cache.

2. A system according to claim 1, wherein the key-value storage device stores a data object and a metadata object for the file.

3. A system according to claim 1, wherein the KVFS shim further includes a file descriptor locator table to store a file descriptor corresponding to the file.

4. A system according to claim 3, wherein the first command unit is operative to send the file system command and the file descriptor to the file system.

5. A system according to claim 3, wherein the KVFS shim further includes a name generator unit to generate the file name from the object name.

6. A system according to claim 1, wherein the KVFS includes a KVFS cache.

7. A system according to claim 6, wherein the KVFS cache is operative to store a copy of the data for the object from the key-value storage device.

8. A system according to claim 7, wherein the return unit is operative to return less than the entirety of the data for the object stored in the KVFS cache to the file system.

9. A system according to claim 1, wherein the KVFS includes an inode, the inode storing metadata for an object from the key-value storage device.

10. A system according to claim 1, wherein based at least in part on the page cache storing the data for the object and the file system command requesting the data for the object, the file system may return the data for the object from the page cache without sending the file system command to the KVFS.

11. A method, comprising:
receiving a file system command, the file system command identifying a file;
accessing an inode corresponding to the file;
accessing an object name from the inode, the object name identifying an object stored in a key-value storage device;
attempting to perform a command on the object in a key-value file system (KVFS) cache in a KVFS; and
returning a result of the command,
wherein the object is stored on the key-value storage device and data for the object is stored in a page cache in a file system.

12. A method according to claim 11, wherein attempting to perform a command on an object in a key-value file system (KVFS) cache includes:
searching the KVFS cache for the object name; and
based at least in part on an object with the object name existing in the KVFS cache, performing a command on the object in the KVFS cache.

13. A method according to claim 12, wherein attempting to perform a command on an object in a key-value file system (KVFS) cache further comprises, based at least in part on the object with the object name not existing in the KVFS cache, includes:
mapping the file system command to a key-value system command;
sending the key-value system command on the object with the object name to the key-value storage device;
receiving the object from the key-value storage device; and
storing the object in the KVFS cache.

14. A method according to claim 13, wherein returning a result of the key-value system command includes:
accessing less than the entirety of a data for the object; and
returning the less than the entirety of the data as the key-value system result.

15. A method according to claim 11, further comprising, based at least in part on not locating an inode corresponding to the file descriptor:
requesting a metadata object from the key-value storage device, the metadata object identified by the file name;
receiving the metadata object from the key-value storage device, the metadata object including metadata for the file;
extracting the metadata from the metadata object; and
creating the inode using the metadata.

16. A method according to claim 11, wherein attempting to perform a command on an object in a key-value file system (KVFS) cache includes modifying the inode responsive to the file system command.

17. A method according to claim 16, wherein attempting to perform a command on an object in a key-value file system (KVFS) cache further includes:
deleting the metadata object from the key-value storage device; and
storing a replacement metadata object on the key-value storage device.

* * * * *